(12) United States Patent
Johnston et al.

(10) Patent No.: US 11,207,939 B2
(45) Date of Patent: Dec. 28, 2021

(54) VEHICLE THERMAL MANAGEMENT SYSTEM AND HEAT EXCHANGERS

(71) Applicant: Apple Inc., Cupertino, CA (US)

(72) Inventors: Vincent G. Johnston, Half Moon Bay, CA (US); Donald P. Yuhasz, Sunnyvale, CA (US); Mark R. Hoehne, Los Gatos, CA (US)

( * ) Notice: Subject to any disclaimer, the term of this patent is extended or adjusted under 35 U.S.C. 154(b) by 344 days.

(21) Appl. No.: 16/089,641

(22) PCT Filed: Aug. 30, 2017

(86) PCT No.: PCT/US2017/049348
§ 371 (c)(1),
(2) Date: Sep. 28, 2018

(87) PCT Pub. No.: WO2018/045013
PCT Pub. Date: Mar. 8, 2018

(65) Prior Publication Data
US 2019/0118610 A1    Apr. 25, 2019

Related U.S. Application Data

(60) Provisional application No. 62/382,794, filed on Sep. 2, 2016, provisional application No. 62/533,949, filed on Jul. 18, 2017.

(51) Int. Cl.
*B60H 1/00* (2006.01)
*B60H 1/14* (2006.01)
(Continued)

(52) U.S. Cl.
CPC ..... *B60H 1/00278* (2013.01); *B60H 1/00321* (2013.01); *B60H 1/00885* (2013.01);
(Continued)

(58) Field of Classification Search
CPC ............ B60H 1/00278; B60H 1/00321; B60H 1/143; B60H 1/00988; B60H 1/00885;
(Continued)

(56) References Cited

U.S. PATENT DOCUMENTS 5,537,956 A   7/1996  Rennfeld et al.
7,789,176 B2  9/2010  Zhou
(Continued)

FOREIGN PATENT DOCUMENTS

CN    104334388 A      2/2015
DE    102012010697 A1  12/2013
(Continued)

OTHER PUBLICATIONS

International Search Report and Written Opinion dated Feb. 5, 2018, in International Application No. PCT/US2017/049348 (17 pp).

*Primary Examiner* — Harry E Arant
(74) *Attorney, Agent, or Firm* — Young Basile Hanlon & MacFarlane, P.C.

(57) ABSTRACT

A vehicle thermal management system includes selective use of a liquid cooled gas cooler (LCGC) and conductive heat exchangers between heating, cooling, battery, and powertrain thermal management loops to increase temperature control and efficiency of the system.

19 Claims, 17 Drawing Sheets

(51) Int. Cl.
  *F25B 25/00* (2006.01)
  *H01M 10/625* (2014.01)
  *F25B 40/00* (2006.01)
  *H01M 10/66* (2014.01)
  *B60L 58/26* (2019.01)
  *B60L 58/27* (2019.01)
  *B60H 1/32* (2006.01)

(52) U.S. Cl.
  CPC ......... *B60H 1/00899* (2013.01); *B60H 1/143* (2013.01); *B60H 1/32284* (2019.05); *B60L 58/26* (2019.02); *B60L 58/27* (2019.02); *F25B 25/005* (2013.01); *F25B 40/00* (2013.01); *H01M 10/625* (2015.04); *H01M 10/66* (2015.04); *B60H 2001/00307* (2013.01); *B60H 2001/00928* (2013.01); *B60H 2001/00935* (2013.01); *B60L 2240/545* (2013.01)

(58) Field of Classification Search
  CPC ...... B60H 1/32284; B60H 2001/00307; B60H 2001/00935; B60H 2001/00928; F25B 25/005; H01M 10/625; B60L 58/26; B60L 58/224; B60L 58/545
  See application file for complete search history.

(56) References Cited

U.S. PATENT DOCUMENTS

| | | |
|---|---|---|
| 7,841,431 B2 | 11/2010 | Zhou |
| 8,336,319 B2 | 12/2012 | Johnston et al. |
| 8,402,776 B2 | 3/2013 | Johnston et al. |
| 8,448,696 B2 | 5/2013 | Johnston et al. |
| 2010/0012295 A1 | 1/2010 | Nemesh et al. |
| 2012/0241129 A1 | 9/2012 | Kohl et al. |
| 2012/0304674 A1* | 12/2012 | Schwarzkopf ..... B60H 1/32281 62/79 |
| 2013/0061627 A1* | 3/2013 | Neumeister ............... F01P 3/20 62/467 |
| 2015/0129161 A1* | 5/2015 | Nishikawa .............. F01P 7/165 165/43 |
| 2015/0211412 A1* | 7/2015 | Presetschnik ............. F01P 3/20 123/41.1 |
| 2015/0258875 A1* | 9/2015 | Enomoto ................... B60L 3/00 165/104.31 |
| 2016/0023532 A1 | 1/2016 | Gauthier |
| 2016/0107505 A1* | 4/2016 | Johnston ............ B60H 1/00914 165/202 |
| 2016/0339767 A1* | 11/2016 | Enomoto ........... B60H 1/00278 |
| 2016/0344075 A1* | 11/2016 | Blatchley ............... B60W 20/15 |
| 2017/0297407 A1* | 10/2017 | Shan .................. B60H 1/00385 |
| 2018/0208019 A1* | 7/2018 | Sugimura .............. B60H 1/321 |
| 2018/0264913 A1* | 9/2018 | Enomoto ................ F01P 7/161 |

FOREIGN PATENT DOCUMENTS

| | | | |
|---|---|---|---|
| JP | 2014189141 A | | 10/2014 |
| KR | 20040060060 A | * | 7/2004 |
| WO | 2011066951 A1 | | 6/2011 |
| WO | 2013137119 A1 | | 9/2013 |

* cited by examiner

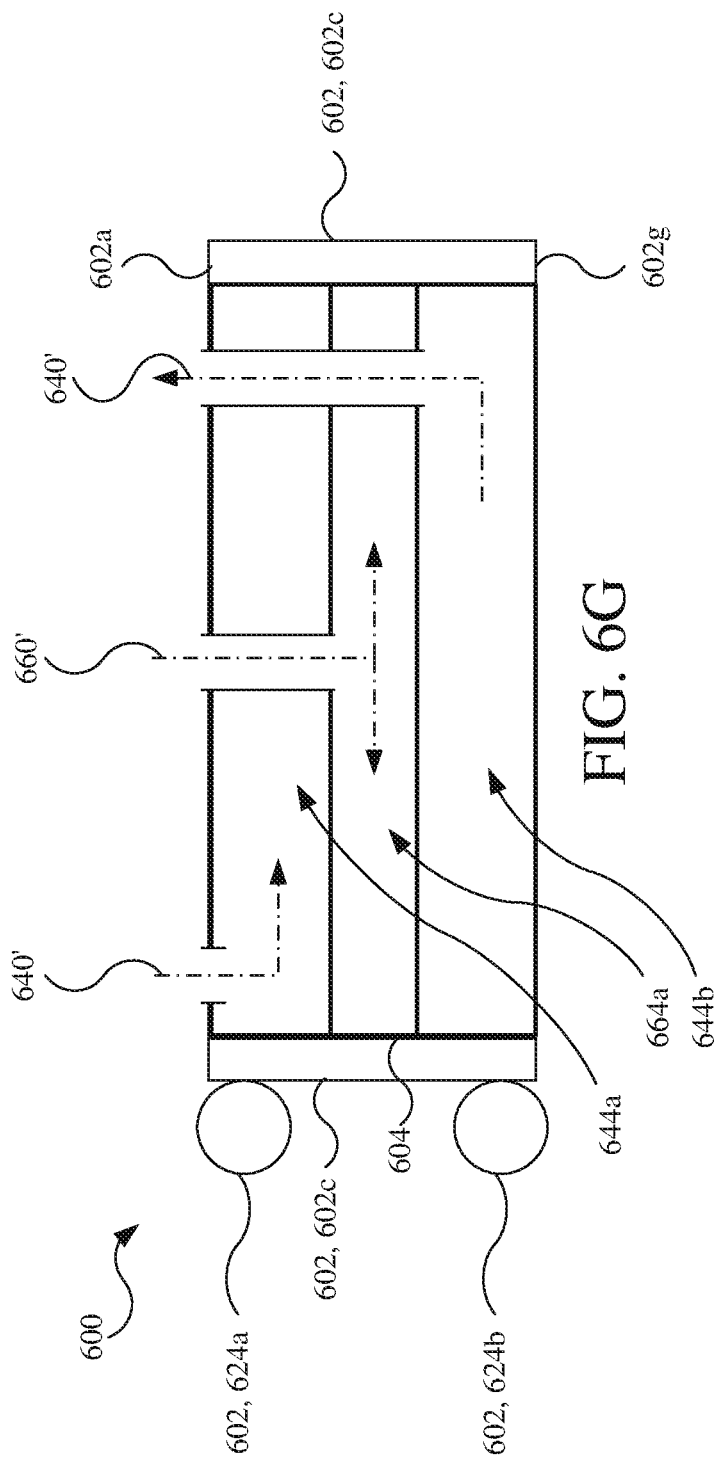

VEHICLE THERMAL MANAGEMENT SYSTEM AND HEAT EXCHANGERS

CROSS-REFERENCE TO RELATED APPLICATION(S)

This application claims priority to and the benefit U.S. Provisional Application No. 62/382,794 (filed Sep. 2, 2016) and U.S. Provisional Application No. 62/533,949 (filed Jul. 18, 2017), the entire disclosures of which are incorporated by reference herein.

TECHNICAL FIELD

This application generally relates to thermal management of vehicle systems and heat exchangers.

BACKGROUND

Battery-powered electric or hybrid vehicles have become an increasingly popular choice by consumers for their fuel efficiency and low impact on the environment. With limits in technology on battery performance and consumer demand for maximum range between vehicle charging, there is an increased need for more efficient power management systems, particularly in the area of vehicle thermal management. The heating and cooling of vehicle operation systems has a significant impact on vehicle efficiency and performance. The heating, cooling and conditioning of the passenger cabin environment is important to passenger comfort and vehicle enjoyment.

Traditional electric and hybrid vehicles employed independent heating and cooling systems using dedicated heating and cooling devices to support the specific vehicle system. For example, if the vehicle battery system required heating at start up in cold temperatures, but cooling during extended operation for optimum battery efficiency, traditional vehicle battery systems employed dedicated heating and cooling devices to support the battery system. These independent systems and dedicated components for each thermal management subsystem consume more power, are less efficient, and add complexity, packaging space, weight, and overall cost to the vehicle.

SUMMARY

One aspect of the disclosure is a vehicle thermal management system. The thermal management system includes a refrigerant subsystem or loop, a heating loop, a cooling loop, a battery loop, and a powertrain loop. In one aspect, each of the heating, cooling, battery, and powertrain loops includes a heat exchanger in communication with another of the subsystem loops to provide selective heating or cooling between the communicating loops. In another aspect, only the cooling loop and powertrain loop share a common, dedicated heat exchanger to assist in cooling the powertrain loop coolant.

In another aspect of the disclosure, a modular, self-contained thermal management refrigerant subsystem or loop is disclosed. The modular refrigerant subsystem can be assembled, pre-charged, pre-tested, and delivered as a unit to a vehicle assembly plant or system integrator for efficient hook-up to other vehicle subsystems. In one example, the refrigerant subsystem uses R744 refrigerant.

In another aspect of the disclosure, a thermal management heating subsystem or loop using a liquid cooled gas cooler (LCGC) is disclosed. The LCGC draws heat from the refrigerant subsystem to supplement heat energy in the heating subsystem. In one example, a 3-port valve can be used to selectively add heat to the heating loop coolant for use in heating a passenger cabin or to expel excess heat from the refrigerant system via a low temperature radiator based on a flow position of the 3-port valve. In another aspect, the 3-port valve can blend or direct a flow of the heating loop coolant to both heat the passenger cabin and expel heat to the low temperature radiator to further control temperature in the heating and refrigerant loops. In another example, the LCGC can be the sole source of heat energy provided to the heating loop.

In another aspect of the disclosure, a thermal management battery subsystem or loop is disclosed. In one aspect, the battery loop selectively uses a heat exchanger in communication with the heating loop and a heat exchanger in thermal communication with a cooling loop to selectively provide heat to, or remove heat from, the battery loop coolant as needed for efficient battery module operation. In another aspect, the battery loop selectively adds heat directly from the LCGC, selectively removes heat directly by a chiller without the need for additional heat exchangers between the battery loop and the heating and cooling loops. In one example, a 4-port valve can be used to selectively provide heat, remove heat, bypass additional heating or cooling, or provide a blend of bypass with heat addition or removal based on a flow position of the 4-port valve to increase the level of temperature control of the battery loop and the battery module.

In another aspect of the disclosure, a thermal management powertrain subsystem or loop is disclosed. The powertrain loop uses a heat exchanger in thermal communication with the cooling loop for efficient cooling of the powertrain subsystem. In one example, a 4-port valve can be employed to selectively use one of two cooling devices in thermal communication with the powertrain loop, provide a bypass to one or both cooling devices, or provide a blend of one of the cooling devices and the bypass based on a flow position of the 4-port valve to increase the level of temperature control of the powertrain loop and powertrain drive components. In another aspect of the disclosure, excess cooling capacity of the refrigeration system is transferred to the powertrain subsystem in order to increase the LCGC heat generation for heating loop heating, even when the powertrain loop does not require additional cooling.

In another aspect of the disclosure, a process for thermal management of the battery loop is disclosed. The process selectively provides heat or removes heat from the battery loop through selected use of two heat exchangers in respective thermal communication with the heating loop and the cooling loop. In another aspect, the addition or removal of heat is respectively provided directly by the LCGC or the chiller rather than separate heat exchangers. In another aspect, a bypass can be used to maintain a measured temperature of the battery loop coolant.

In another aspect, a process for increasing the temperature of a heating loop coolant is disclosed. The process selectively provides heat to the heating loop through use of the LCGC which transfers heat expelled from the refrigerant loop.

In another aspect, a method is provided for thermal management of a battery module through use of a battery loop having a battery loop coolant flowing through the battery loop. The method includes measuring a temperature of the battery loop coolant, increasing the temperature of the battery loop coolant, and decreasing the temperature of the battery loop coolant. The step of increasing the temperature of the battery loop coolant flowing to the battery module includes directing a flow of the battery loop coolant to one of a heating loop heat exchanger in thermal communication with a heating loop or a liquid cooled gas cooler (LCGC) in thermal communication with a refrigerant loop. The step of decreasing the temperature of the battery loop coolant flowing to the battery module includes directing the flow of the battery loop coolant to one of a cooling loop heat exchanger in thermal communication with a cooling loop or a chiller in thermal communication with the refrigerant loop.

In another aspect, a thermal management system includes a refrigerant loop, a heating loop, a cooling loop, and a battery loop. The refrigerant loop includes a refrigerant flowing therethrough, a liquid cooled gas cooler (LCGC), and a chiller, the LCGC and the chiller being in fluid communication by the refrigerant. The heating loop includes a heating loop coolant flowing therethrough, the heating loop being in fluid communication with the LCGC by the heating loop coolant. The cooling loop includes a cooling loop coolant flowing therethrough, the cooling loop being in fluid communication with the chiller by the cooling loop coolant. The battery loop includes a battery loop coolant flowing therethrough, a battery loop valve, and a battery module, the battery loop valve and the battery module being in fluid communication by the battery loop coolant. The battery loop valve includes flow configurations for directing the battery loop coolant to (a) one of the LCGC, or a heating loop heat exchanger that is in fluid communication with the heating loop by the heating loop coolant, to increase a temperature of the battery loop coolant upstream of the battery module, and (b) one of the chiller, or a cooling loop heat exchanger that is in fluid communication with the cooling loop by the cooling loop coolant, to decrease the temperature of the battery loop coolant upstream of the battery module.

In another aspect, a heat exchanger is provided for exchanging heat between at least three fluids that are fluidically separated. The heat exchanger includes refrigerant passes, primary coolant passes, and a secondary coolant pass. The refrigerant passes are configured for a refrigerant to flow serially therethrough. The primary coolant passes are configured for a first coolant to flow serially therethrough. The secondary coolant pass is configured for a second coolant to flow therethrough. The refrigerant passes are configured to exchange heat directly with the primary coolant passes, the primary coolant passes are configured to exchange heat directly with the secondary coolant pass, and the refrigerant passes do not exchange heat directly with the secondary coolant pass.

In another aspect, a heat exchanger includes a refrigerant passage, a primary coolant passage, and a secondary coolant passage. The refrigerant passage is for connecting to a refrigerant loop of a thermal management system for receiving from and transferring thereto a refrigerant. The refrigerant passage is cooperatively defined by refrigerant tubes. The primary coolant passage is for connecting to a primary coolant loop of the thermal management system for receiving from and transferring thereto a primary coolant. The primary the primary coolant passage is cooperatively defined by at least two primary coolant cavities of a core structure of the heat exchanger. The secondary coolant passage is for connecting to a secondary coolant loop of the thermal management system for receiving from and transferring thereto a secondary coolant. The secondary coolant passage is formed by a secondary coolant cavity of the core structure. The refrigerant tubes extend in a serpentine manner through the two primary coolant cavities to exchange heat directly between the refrigerant and the primary coolant and do not extend through the secondary coolant cavity.

A thermal management system includes a refrigerant loop, a first primary coolant loop, a second primary coolant loop, a secondary coolant loop, a first heat exchanger, and a second heat exchanger. The refrigerant loop carries a refrigerant therethrough. The first primary coolant loop carries a first primary coolant therethrough. The second primary coolant loop carries a second primary coolant therethrough. The secondary coolant loop carries a secondary coolant therethrough.

The first heat exchanger is connected to the refrigerant loop, the first primary coolant loop, and the secondary coolant loop for the refrigerant, the first primary coolant, and the secondary coolant, respectively, to flow through the heat exchanger. The first heat exchanger includes a primary coolant passage, a secondary coolant passage, and a refrigerant passage. The first primary coolant flows serially in a first primary coolant pass and a second primary coolant pass of the primary coolant passage. The secondary coolant flows in a secondary coolant pass of the secondary coolant passage. The refrigerant flows serially in at least four refrigerant passes of the refrigerant passage. Heat is exchanged directly between the refrigerant in a first two of the refrigerant passes and the first primary coolant in the first primary coolant pass and directly between the refrigerant in a second two of the refrigerant passes and the first primary coolant in the second primary coolant pass. The second heat exchanger is connected to the refrigerant loop, the second primary coolant loop, and the secondary coolant loop for the refrigerant, the second primary coolant, and the secondary coolant, respectively, to flow through the second heat exchanger. The second heat exchanger includes another primary coolant passage, another secondary coolant passage, and a refrigerant passage. The second primary coolant flows serially in another first primary coolant pass, another a second primary coolant pass, and a third primary coolant pass of the other primary coolant passage. The secondary coolant flows in another secondary coolant pass of the other secondary coolant passage. The refrigerant flows serially in at least another six refrigerant passes of the other refrigerant passage. Heat is exchanged directly between the refrigerant in another first two of the other six refrigerant passes and the second primary coolant in the other first primary coolant pass, directly between the refrigerant in another second two of the six refrigerant passes and the second primary coolant in the other second primary coolant pass, and directly between the refrigerant in a third two of the six refrigerant passes and the second primary coolant in the third primary coolant pass.

For example, in the first heat exchanger, heat may be transferred directly from the secondary coolant to the first primary coolant, and directly from the first primary coolant to the refrigerant. In the second heat exchanger, heat may be transferred directly from the refrigerant to the second primary coolant, and directly from the second primary coolant to the secondary coolant.

BRIEF DESCRIPTION OF THE DRAWINGS

FIG. 6G is a cross-sectional view of the heat exchanger taken along line 6G-6G in FIG. 6A.

DETAILED DESCRIPTION

Thermal management systems are described in the context of use with passenger vehicles. Heat exchange interfaces between individual subsystems or loops can be leveraged to decrease power consumption and increase efficiency of the individual loops and the overall thermal management system. Thermal communication between the respective loops can be conducted without direct communication or mixing of refrigerant or coolant between the respective loops, allowing for closed loop subsystems. Although described in reference to passenger vehicles, these thermal management systems can also be used in other applications.

Figure 1:
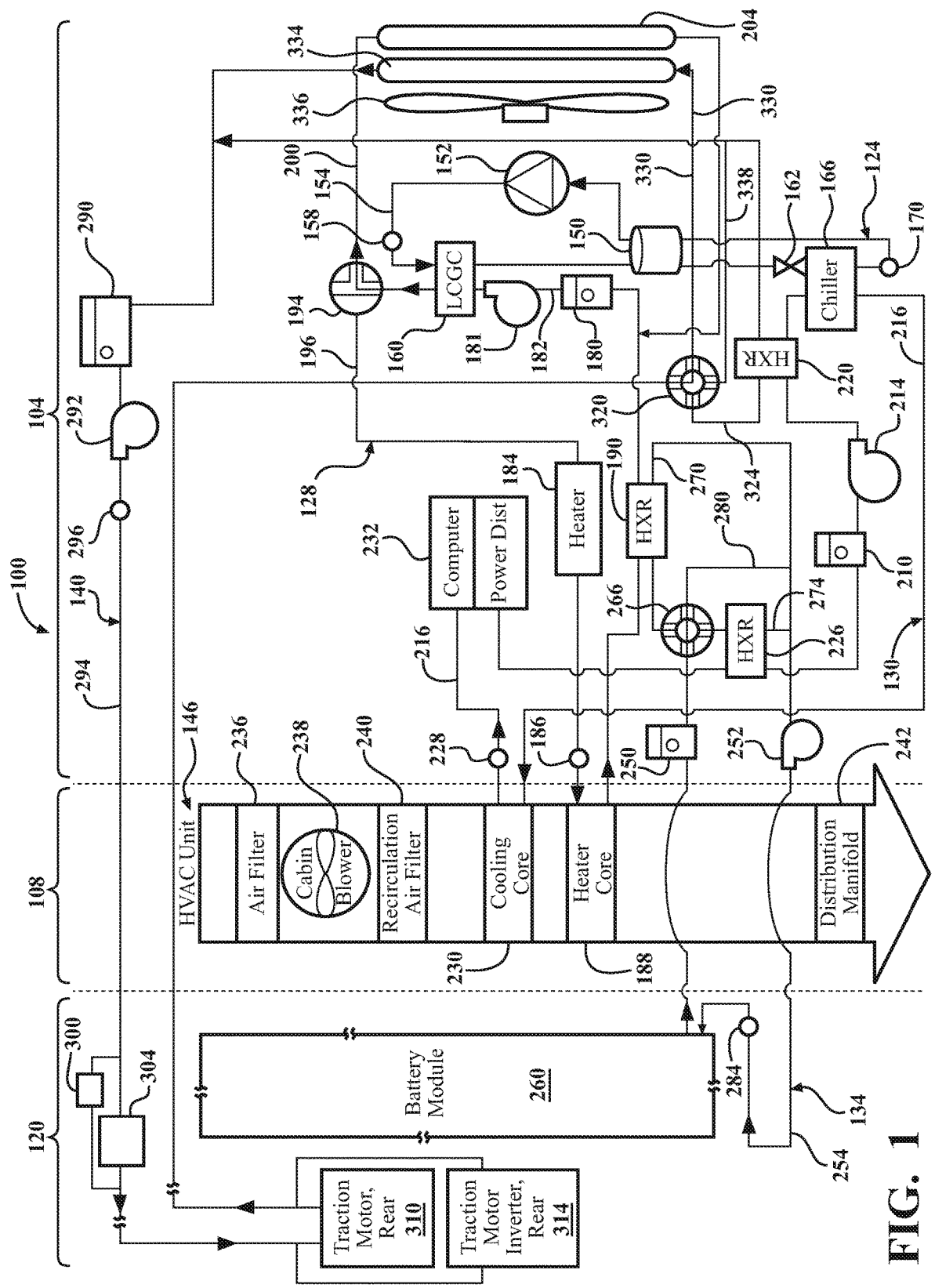
FIG. 1 is a schematic of one example of a thermal management system.

Referring to the example in FIG. 1, a thermal management system 100 is schematically shown for use in a passenger vehicle having a front end 104, commonly referred to as an engine compartment, a passenger compartment or cabin 108, and a rear end 120 typically housing the drivetrain components to power wheels for motion.

In the example shown in FIG. 1, the system 100 includes a refrigerant subsystem or loop 124, a heating subsystem or loop 128, a cooling subsystem or loop 130, a battery subsystem or loop 134, and a powertrain subsystem or loop 140 as generally shown. It is understood that additional components, connecting conduit lines, alternative conduit routing schemes, and additional or alternative system loads can be included (not shown). FIG. 1 also illustrates a heating, ventilation, and air conditioning (HVAC) unit 146 which provides heating, cooling, and conditioning of air for the passenger cabin 108 as described further below.

The refrigerant loop 124 includes an accumulator 150 (e.g., with an internal heat exchanger unit), a compressor 152, a refrigerant line or conduit 154, a first pressure and temperature sensor 158, a liquid cooled gas cooler (LCGC) 160, an expansion valve 162, a chiller 166, and a second temperature and pressure sensor 170 all in fluid communication along the conduit 154 as generally shown. In one example, the refrigerant loop 124 uses R744 refrigerant. Other types of refrigerant, for example R-134a, can also be used. Generally speaking, the term "fluid communication" is used to refer to various components to and/or through which a common fluid flows. For example, the LCGC 160 and the chiller 166 are in fluid communication by the refrigerant, which flows therethrough.

In the FIG. 1 example, the compressor 152 compresses the vapor phase refrigerant to high pressure and temperature and forces the refrigerant toward the LCGC 160. The LCGC 160 is a high-pressure refrigerant to coolant heat exchanger. As shown in FIG. 1, the LCGC 160 is in thermal communication with the heating loop 128, thereby providing a source of heat/thermal energy to the heating loop 128 from heat expelled from the refrigerant loop 124. The transfer of expelled heat from the refrigerant loop 124 to the heating loop 128 can be made without direct communication or contact between the refrigerant and the heating loop coolant as discussed further below. Through use of R744 refrigerant, the system 100 can operate as a heat generator in temperatures down to −30° Celsius. In this manner, the refrigerant loop 124 operates as a heat pump to generate heat from a refrigerant cycle. Generally speaking, the term "thermal communication" refers to loops and fluids and/or components thereof that transfer heat to other loops and fluids and/or components thereof. For example, each of the refrigerant loop 124, the refrigerant, and/or the LCGC 160 may be considered in thermal communication with the heating loop 128 and the heating loop coolant. Thermal communication may include direct heat transfer.

On exiting the LCGC 160, the cooled refrigerant flows through a refrigerant to refrigerant heat exchanger internal to the accumulator 150 to lower the refrigerant temperature further. The high pressure, low temperature vapor phase refrigerant then flows through an expansion valve 162 that reduces the pressure of the refrigerant, causing it to condense into a liquid phase refrigerant. The refrigerant can be forced into the chiller 166 as generally shown. In the FIG. 1 example, the liquid phase refrigerant absorbs heat from the coolant loop coolant in the chiller 166 as it evaporates back to a vapor phase refrigerant. The refrigerant then flows through the accumulator 150 where any residual liquid refrigerant can be stored and only vapor phase refrigerant can be selectively moved to the compressor 152 to start the cycle again. The remaining liquid phase refrigerant in the accumulator 150 absorbs heat from the refrigerant to refrigerant heat exchanger internal to the accumulator 150.

The refrigerant loop 124 in the FIG. 1 example can be an independent, closed-loop system which cools or draws heat away from the refrigerant through use of the LCGC 160 instead of using a forced air to refrigerant condenser/gas cooler present in conventional refrigeration systems. The LCGC 160 transfers the heat from the refrigerant, thereby cooling the refrigerant and transferring that heat into the heating loop coolant as further discussed below. Through use of a self-contained refrigerant loop 124 which does not require a traditional air to refrigerant condenser/gas cooler for removing heat, the refrigerant loop 124 can be preassembled, filled with refrigerant, tested, packaged, and shipped directly to the final assembly facility or a systems integrator for rapid installation in the partially assembled vehicle.

Still referring to FIG. 1, an example of the heating loop 128 is shown. In the example, the heating loop 128 includes a reservoir 180 for the storage of heating loop coolant, a pump 181 to force the heating loop coolant through a line or conduit 182 in a closed loop, an electric heater 184, and a temperature sensor 186 to monitor the temperature of the heating loop coolant as generally shown.

As discussed above for FIG. 1, the LCGC 160 can be positioned to be in thermal communication, but not direct refrigerant fluid to coolant fluid communication, with both the heating loop 128 and the refrigerant loop 124. The LCGC 160 can transfer heat expelled from the refrigerant to the heating loop coolant for use by other vehicle systems requiring heated fluid, for example, a heater core 188 that is part of the HVAC unit 146, and can be used to selectively heat the passenger cabin 108. An advantage of the heating loop 128 and use of the LCGC 160 is that the system 100 can operate at a Coefficient of Performance (COP) greater than 1. The COP is the ratio of thermal power to electrical power.

In the FIG. 1 example, the electric heater 184 can be included to selectively supply additional heat or thermal energy to warm the flow of heating loop coolant flowing through the electric heater 184 toward the heater core 188. The heating loop 128 can also include a heating loop heat exchanger 190 in thermal conductive communication with the battery loop 134 as generally shown. The heat exchanger 190 selectively provides heat energy from the heating loop coolant to the battery loop 134 as further discussed below.

In the example of FIG. 1, the heating loop 128 includes a valve 194 in alternative fluid communication with a heating conduit 196 and an exhaust conduit 200, both positioned downstream of the valve 194 as generally shown. The heating conduit 196 provides a path for the heating loop coolant to flow through heater core 188 and heat exchanger 190. The exhaust conduit 200 provides a path for the heating loop coolant to flow through a low temperature radiator 204 (e.g., a heating loop radiator) to expel or dump heat to the atmosphere as generally shown. The low temperature radiator 204 cools the heating loop coolant through convection or forced air as further described below. Both the heating conduit 196 and the exhaust conduit 200 return the heating loop coolant to the LCGC 160 in a closed loop as described above.

In the FIG. 1 example, the valve 194 can be a 3-port valve which selectively directs the flow of the heating loop coolant through the heating conduit 196 to the heater core 188 and the heat exchanger 190 or through the exhaust conduit 200 to the low temperature radiator 204 to exhaust heat from the heating loop coolant to the atmosphere. In one aspect, the valve 194 includes flow positions allowing it to mix or blend the flow of heating loop coolant to both the heating conduit 196 and the exhaust conduit 200. For example, the valve 194 can simultaneously direct a portion of the heating loop coolant to flow to the heating conduit 196 and a portion of the heating loop coolant to flow to the exhaust conduit 200 to further control the temperature of the heating loop coolant as well as the refrigerant loop 124.

In the examples discussed herein, the term "coolant" is used to include an automotive grade mixture of about equal parts of ethylene glycol and water. It is understood that different fluids and/or different mixtures of ethylene glycol and water can be used.

Still referring to FIG. 1, an example of the cooling subsystem or loop 130 is illustrated. In the example, the cooling loop 130 includes a reservoir 210 for the storage of cooling loop coolant and a pump 214 to selectively force the flow of cooling loop coolant through a closed-loop cooling line or conduit 216 as generally shown.

In the FIG. 1 example, the cooling loop conduit 216 is in thermal communication with the refrigerant loop 124 through the chiller 166. As described above, as the refrigerant of the refrigerant loop 124 flows through the chiller 166, the refrigerant draws or absorbs heat as it evaporates inside the chiller 166 which in turn removes heat from the cooling loop conduit 216. In this example, the cooling loop 130 includes a powertrain heat exchanger 220 in thermal communication with the powertrain loop 140 and a battery heat exchanger 226 in thermal communication with the battery loop 134 as generally shown. A temperature sensor 228 in communication (e.g., thermal and/or fluid communication) with cooling loop coolant can also be used to measure and monitor the temperature and other conditions of the cooling loop coolant. The cooling loop 130 can also extend through a cooling core 230 described further below in reference to the HVAC unit 146.

Additional operational and control components 232, for example, computing and power distribution components, can also be placed in fluid communication with the cooling loop 130. The FIG. 1 powertrain heat exchanger 220 and the battery heat exchanger 226 independently operate to respectively and selectively transfer heat from the powertrain loop coolant and the battery loop coolant, for example, through conduction with the cooling loop coolant, to reduce the temperature of the battery loop coolant and the powertrain loop coolant as further described below.

Still referring to FIG. 1, the HVAC unit 146 can be used to filter air, cool and de-humidify air, and heat air to ventilate and condition the passenger cabin 108. In the example shown, the HVAC unit 146 includes an air filter 236, at least one cabin blower 238, a recirculation air filter 240, and a distribution manifold 242 for selective distribution of air to and from the passenger cabin 108. The heating loop 128 and the cooling loop 130 are in fluid communication with the heater core 188 and the cooling core 230 of the HVAC unit 146 respectively. One or more of the cabin blowers 238 can be used to force air over the respective cores 188, 230 to selectively heat or cool the passenger cabin 108. The air filter 236 can be positioned upstream of the cabin blower 238 in communication with environmental air. The recirculation air filter 240 can also be used to filter both environmental air and recirculated cabin air entering the HVAC unit 146. The heating and cooling controls (not shown) for the passenger cabin 108 can be in electronic communication with the cabin blowers 238 through control units (not shown).

An advantage of the system 100 and use of the cooling loop 130 is the elimination of a dedicated air-to-refrigerant evaporator core and refrigerant conduit connections inside the passenger cabin 108 required by prior designs that have the potential to leak refrigerant into the cabin air. Use of the chiller 166 to remove heat from the cooling loop coolant cools the cooling loop coolant without the need for a separate, dedicated cooling/evaporator core along the cooling loop 130.

FIG. 1 further illustrates the battery loop 134. In the example, the battery loop 134 includes a reservoir 250 for the storage of liquid battery loop coolant and a battery loop pump 252 to selectively force the flow of battery loop coolant through a closed-loop cooling line or conduit 254 in fluid communication with a battery module 260. The battery module 260 provides the principal or supplemental power to drive motors which power the drive wheels of the vehicle.

In the FIG. 1 example, a 4-port valve 266 can be positioned in fluid communication with a heating conduit 270, a cooling conduit 274, and a bypass conduit 280 as generally shown. The valve 266 is operable to selectively direct a flow of battery loop coolant to the heating conduit 270 and through the heat exchanger 190 which will add heat to the battery loop coolant from the heating loop 128. It can be desirable to temporarily heat the battery module 260, for example, during start up and early operation in cold environmental temperatures.

The valve 266 is also operable to selectively direct the flow of battery loop coolant to the cooling conduit 274 and through the battery heat exchanger 226 in thermal communication with the cooling loop 130 to remove heat from the battery loop coolant to reduce or maintain the temperature of the battery module 260. Alternatively, the valve 266 is further operable to selectively direct the flow of battery loop coolant to the bypass conduit 280 to avoid additional heating or cooling of the battery loop coolant by the respective heat exchangers 190, 226. In one example, the valve 266 includes additional flow positions in which a portion of the battery loop coolant is directed to blend flow to both the heating conduit 270 and the bypass conduit 280 or blend flow to both the cooling conduit 274 and the bypass conduit 280 for increased control of the temperature of the battery loop coolant and of the battery module 260.

An advantage of the FIG. 1 system 100 and use of the battery loop 134 is that a dedicated heater and a dedicated chiller/cooling device is not needed along the battery loop 134 due to use of the respective heat exchangers 190, 226.

FIG. 1 further shows an example of the powertrain loop 140. The powertrain loop 140 includes a reservoir 290 for storage of powertrain loop coolant, a pump 292 to selectively force flow of the powertrain loop coolant through a line or conduit 294, a temperature sensor 296 to measure and monitor the temperature of the powertrain loop coolant, a battery charger 300, a control circuit and power electronics module 304, a traction motor 310, and a traction motor invertor 314 for the vehicle rear wheels as generally shown.

In the FIG. 1 example, a 4-port valve 320 can be in fluid communication with the powertrain loop conduit 294 and a cooling conduit 324 in communication with the heat exchanger 220 on the cooling loop 130 as previously described. Alternatively, the valve 320 can direct the flow of powertrain loop coolant to an exhaust conduit 330 in communication with a high temperature radiator 334 (e.g., a powertrain radiator) positioned at the front end 104 of the vehicle as generally shown. The high temperature radiator 334 can be operable to exhaust heat or remove heat from the powertrain loop coolant to the atmosphere through forced air induced by a fan 336 or by movement of the vehicle.

The valve 320 can also be in communication with a bypass conduit 338 which selectively keeps powertrain loop coolant from being directed to the cooling conduit 324, the exhaust conduit 330, and thus, the heat exchanger 220 or the high temperature radiator 334. In the FIG. 1 example, the valve 320 further includes a flow position in which a portion of the powertrain loop coolant is directed to blend flow to both the cooling conduit 324 and the bypass conduit 338 or to blend flow to both the exhaust conduit 330 and the bypass conduit 338 for increased control of the temperature of the powertrain loop coolant and components in fluid communication with the powertrain loop 140. Although the traction motor 310 and associated components are shown for the rear wheels of the vehicle, it is understood that the powertrain loop 140 is equally applicable to the front wheels of a vehicle or both the front and rear wheels, for example, in a four-wheel drive vehicle.

In one aspect of the powertrain loop 140, excess cooling capacity of the refrigerant loop 124 is transferred to the powertrain loop 140 in order to increase heat generation or output by the LCGC 160 for heating the heating loop 128, even when the powertrain loop 140 does not require additional heating. In other words, the powertrain loop 140 and the valve 320 may be used to continuously warm or transfer heat to the cooling loop 130 thereby raising the temperature of the cooling loop coolant. This heat in the cooling loop coolant is then transferred to the chiller 166 to warm the refrigerant in the refrigerant loop 124 as described above. This in turn causes an additional load on the refrigerant loop compressor 152. Through additional load or running of the compressor 152, more heat is generated or expelled through the LCGC 160 which may be used for additional heating of the passenger cabin 108 or the battery loop 134 as described above. In this manner, the refrigerant loop 124 is effectively being used as a heat pump, i.e., use of a refrigeration cycle or the refrigerant loop 124 to generate heat. In this manner, the Coefficient of Performance for heating may exceed 2 or 3.

Figure 2:
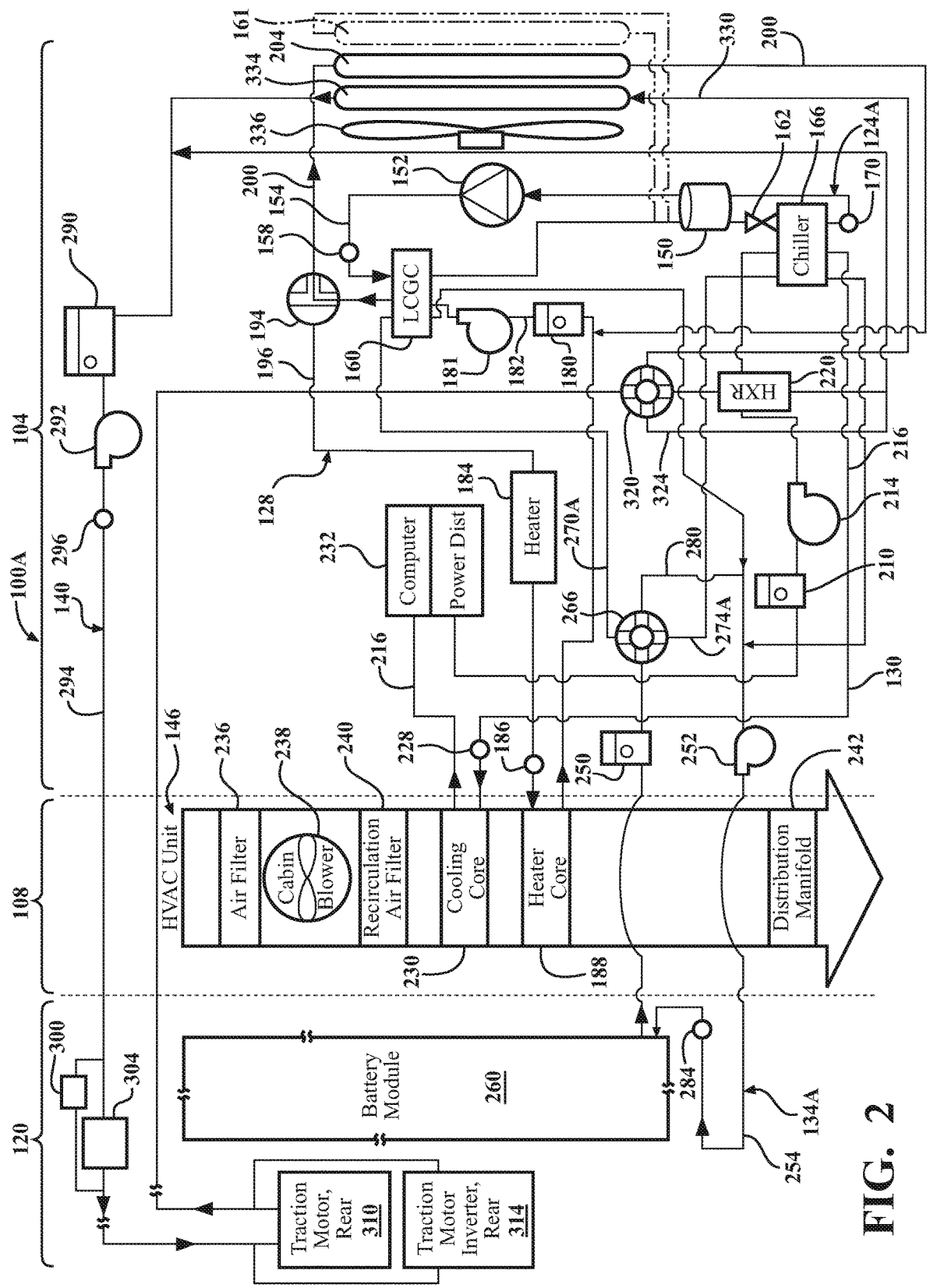
FIG. 2 is a schematic of an alternate example of a thermal management system similar to the thermal management system of FIG. 1.

Referring to FIG. 2, an alternate aspect of the thermal management system 100 of FIG. 1 is shown. Where identical components disclosed in FIG. 1 are included, the same reference numbers are used and not further described except where noted. In the FIG. 2 example, aspects of the refrigerant loop 124, the heating loop 128, the cooling loop 130, the battery loop 134, the powertrain loop 140, and the HVAC unit 146 are as generally described above in FIG. 1. When the components are slightly modified, the use of an "A" after the reference numeral is employed.

An alternate refrigerant loop 124A, shown in FIG. 2, includes an optional gas cooler radiator 161 (e.g., refrigerant radiator) as generally shown in dotted line to further reduce the temperature of the refrigerant flowing from the LCGC 160 to the accumulator 150. A valve (not shown) or other device may be used to bypass the gas cooler radiator 161 and selectively route refrigerant directly from the LCGC 160 to the accumulator 150 as shown in FIG. 1.

FIG. 2 also shows an alternate battery loop 134A. The battery loop 134A includes a heating conduit 270A routed directly to, and in thermal communication with, the LCGC 160 as generally shown without the separate heat exchanger 190 as described in FIG. 1. When the valve 266 is selectively positioned to direct battery coolant to the heating conduit 270A, the LCGC 160 provides additional heat directly to the battery coolant in the manner generally described in FIG. 1.

The battery loop 134A of FIG. 2 also includes a cooling conduit 274A routed directly to, and in thermal communication with, the chiller 166 as generally shown without the separate heat exchanger 226 described in FIG. 1. When the valve 266 is selectively positioned to direct battery coolant to the cooling conduit 274A, the chiller 166 removes heat from or cools the battery coolant in the manner generally described in FIG. 1. The bypass conduit 280 is used with the heating conduit 270A and the cooling conduit 274A, as well as with various positions of the valve 266, to blend the battery coolant flow to both the heating conduit 270A or the cooling conduit 274A with the bypass conduit 280 as described for FIG. 1. The FIG. 2 example is advantageous in that the heat exchangers 190 and 226 of FIG. 1 are eliminated and replaced by expanded use of the LCGC 160 and the chiller 166.

In an example of the structure of the LCGC 160 as configured in FIG. 2, the battery loop heating conduit 270A carrying the battery coolant is placed in thermal communication with the refrigerant conduit 154 carrying the high pressure and high temperature refrigerant. In addition, the heating loop conduit 182 is placed in thermal communication with the refrigerant conduit 154. The position of the battery loop valve 266, the position of the heating loop valve 194, and operation of the compressor 152 determine which, if any, of the fluids are actively flowing through the LCGC 160 depending on the demands or loads on the system 100A. Examples of heat exchangers that may be used as the LCGC 160 of the thermal management system 100A are discussed further below with reference to FIGS. 6A-10.

The construction of the chiller 166 as configured in FIG. 2 would be the same as for the LCGC 160 described above. Further, the construction of the LCGC 160 and the chiller 166 in the FIG. 1 example would be similar in the FIG. 2 example except that the battery loop heating conduit 270A and the battery loop cooling conduit 274A would not be included in either the LCGC 160 or the chiller 166 in the FIG. 1 configuration. Examples of heat exchangers that may be used as the chiller 166 of the thermal management system 100A are discussed further below with reference to FIGS. 6A-10.

It should be understood that the various valves disclosed herein may be different types of valves and/or be formed of multiple valves. Furthermore, the flow positions of such valves may also be referred to as configurations accounting for the different types of valves and/or combinations of valves that may provide similar flow paths.

Figure 3:
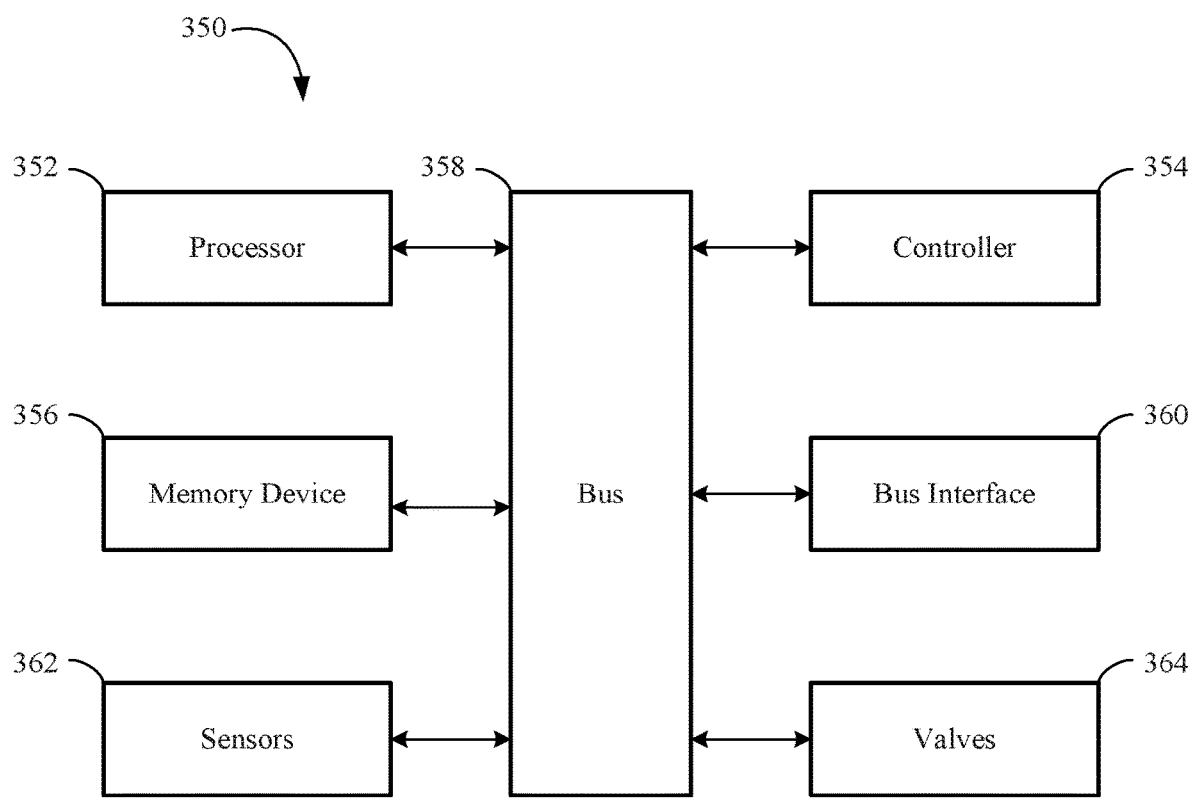
FIG. 3 is a block diagram of an electronic control system.

Referring to FIG. 3, an electronic control system 350 is shown which includes, or is in electronic and digital communication with, a processor 352, a programmable controller 354, and a temporary and/or permanent memory device 356 for storing algorithms, computer code instructions and data. These components are all in communication with each other through a bus 358 or other similar device. A human machine interface (HMI) and other components (not shown) can also be included and connected through a bus interface 360. The electronic control system 350 can be part of a vehicle electronic control unit (ECU) (not shown) or can be separate and in communication with the vehicle ECU. Although described in use with FIG. 1 system 100 below, it is understood system 350 is equally applicable to the system 100A example shown in FIG. 2.

The previously described temperature and/or pressure sensors (collectively shown as 362) for each of the thermal management subsystem loops 124, 128, 130, 134, 140 are also in electronic and/or digital communication with the electronic control system 350. In one example of the system 100, the electronic control system 350 monitors the temperature and/pressure sensor signals and data generated by the sensors 362 and adjusts the respective valves 194, 266, 320 (collectively shown as 364) to the appropriate flow position according to pre-programmed and stored software or coded instructions in the electronic control system 350. In a similar manner, the various pumps 214, 252, 292, the compressor 152, and other components which are selectively operable as previously described can be in electronic and/or digital communication with the electronic control system 350 through the bus interface 624 for operation, coordination, sequencing, and control of the functions and operations described herein.

For example, if the temperature sensor 284 on the battery loop 134 measures the temperature of the battery loop coolant to be above a preprogrammed temperature target or range, the electronic control system 350 can automatically and electronically adjust the valve 266 to a flow position that directs the battery loop coolant to the cooling conduit 274 through the battery heat exchanger 226 to cool or remove thermal heat from the battery loop 134, reducing the temperature of the battery loop coolant and the battery module 260 to within the predetermined temperature target or range. A similar process can be executed if the temperature sensor 284 measures the temperature of the battery loop coolant to be below a preprogrammed temperature target or range. The electronic control system 350 can adjust the flow position of the valve 266 to direct the flow of battery loop coolant toward the heating conduit 270 and the heat exchanger 190 to add thermal heat to the battery loop coolant. Alternatively, the bypass conduit 280 or various combinations of the cooling conduit 274, the heating conduit 270, and the bypass conduit 280 described above can receive the battery loop coolant based on the flow position of the valve 266 and depending on the preprogrammed ranges and measured operating conditions of the battery loop 134.

A similar loop sensor measurement and valve control operation or process can be used for the heating loop 128 to add heat through the LCGC 160 or expel heat through the low temperature radiator 204. A similar loop sensor measurement and valve control operation or process can be used for the powertrain loop 140 to cool or bypass the cooling and exhaust conduits 324, 330. Other devices and methods of monitoring and controlling the flow position of the valves 364 and the flow of refrigerant or coolant can be used. In another example, the electronic control system 350 can further monitor and control the operation of the refrigerant loop 124 through adjusting and controlling operation of the compressor 152 speed and expansion valve 162 position to control the temperature and pressure of the refrigerant for the refrigerant loop 124 and the coolant for the loops 128, 130, 134, 140 in communication with refrigerant loop 124.

In other examples, different valve or fluid control devices (not shown) for controlling the flow of coolant through the heating, cooling, battery, and powertrain loops 128, 130, 134, 140 can be used. Further, different conduit numbers, configurations and routing for each loop can be made to suit the particular application. Different heat transfer devices than the disclosed heat exchangers 190, 220, 226, the chiller 166, and the LCGC 160 can also be used to obtain the disclosed features and functions.

Figure 4:
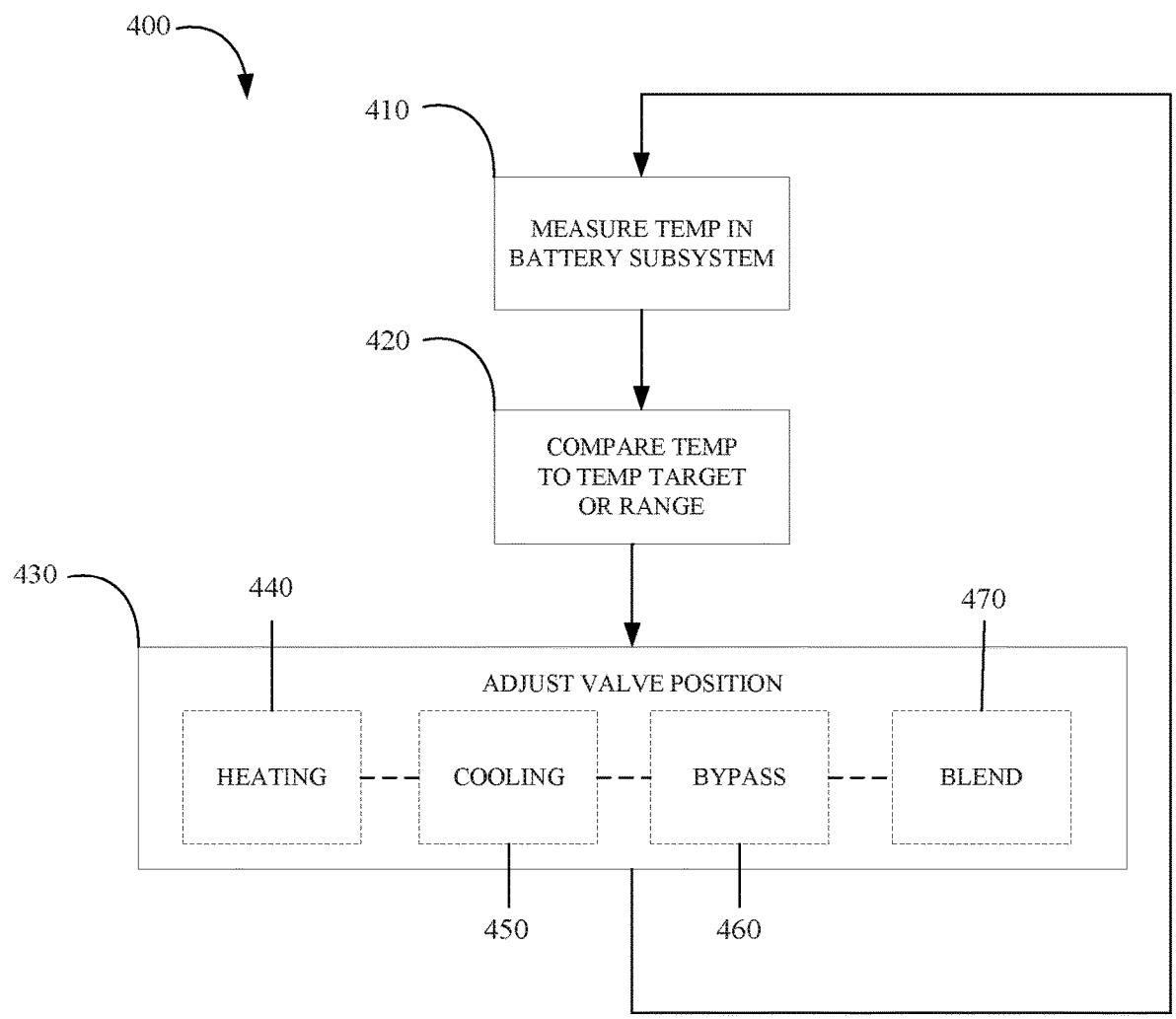
FIG. 4 is a flow chart of one example of a method of thermal management of a vehicle battery module.

Referring to FIG. 4, a process 400 for monitoring and altering the temperature of the thermal management battery subsystem or loops 134, 134A is illustrated. In the example, process step 410 monitors the temperature of the battery loop coolant in the battery loops 134, 134A. In the example shown in FIGS. 1 and 2, the temperature sensor 284 measures the temperature of the battery loop coolant and transfers temperature management data to the electronic control system 350 of FIG. 3.

In step 420, the measured received battery loop coolant temperature data can be compared to a preprogrammed temperature target or temperature range that can be pre-stored in the memory device 356 connected to the electronic control system 350. In one example, the stored temperature target is an acceptable value or range for optimal performance of the battery module 260. It is understood that this comparison step 420 can be eliminated and replaced with a less sophisticated temperature measurement device and/or system.

In step 430, the electronic control system 350 automatically adjusts the flow position of the battery loop coolant flow valve 266 to add heat, remove heat, or maintain the measured temperature of the battery loop coolant. The valve 266 can be adjusted to a variety of positions as described in the alternative sub-steps below.

In sub-step 440, on determination that the measured battery loop coolant temperature is below the preprogrammed temperature target or range, the flow position of the valve 266 can be automatically adjusted to add heat to the battery coolant as described above and generally illustrated. For example, the valve 266 can direct the flow of the battery loop coolant to the heating conduit 270 and through the heat exchanger 190 as shown in FIG. 1 or to the heating conduit 270A and through the LCGC 160 as shown in FIG. 2 to add thermal heat to the battery coolant.

In alternative sub-step 450, on determination that the measured battery loop coolant temperature is above a preprogrammed target value or range, the flow position of the valve 266 can be automatically adjusted to remove heat or cool the battery coolant as described above and generally illustrated. For example, the valve 266 can direct the battery loop coolant to the cooling conduit 274 and through the heat exchanger 226 in communication with the cooling loop 130 as shown in FIG. 1 or to the cooling conduit 274A and the chiller 166 as shown in FIG. 2 to remove thermal heat from the battery loop coolant.

In alternative sub-step 460, on determination that the measured battery loop coolant temperature is at the target value or within the target/acceptable range, the flow position of the valve 266 can be automatically adjusted to direct the flow of battery loop coolant to the bypass conduit 280 to avoid the flow of battery loop coolant to either of the heat exchangers 190, 226 in FIG. 1, or the LCGC 160 or the chiller 166 in FIG. 2, to avoid adding or removing thermal heat from the battery loop coolant. In another alternative sub-step (not shown), the speed of the battery loop pump 252 can be reduced, increased, or stopped, temporarily idling the flow of battery loop coolant through the battery loop 134. The activation, change in speed, or idling of the other pumps discussed and illustrated in the other system loops may also be controlled by electronic control system 350.

In another alternative sub-step 470, the flow position of the valve 266 can be automatically adjusted to a position so as to direct the battery loop coolant to partially flow to both the heating conduits 270, 270A and the bypass conduit 280 or to both the cooling conduits 274, 274A and the bypass conduit 280 for increased control of the temperature of the battery loop coolant.

Figure 5:
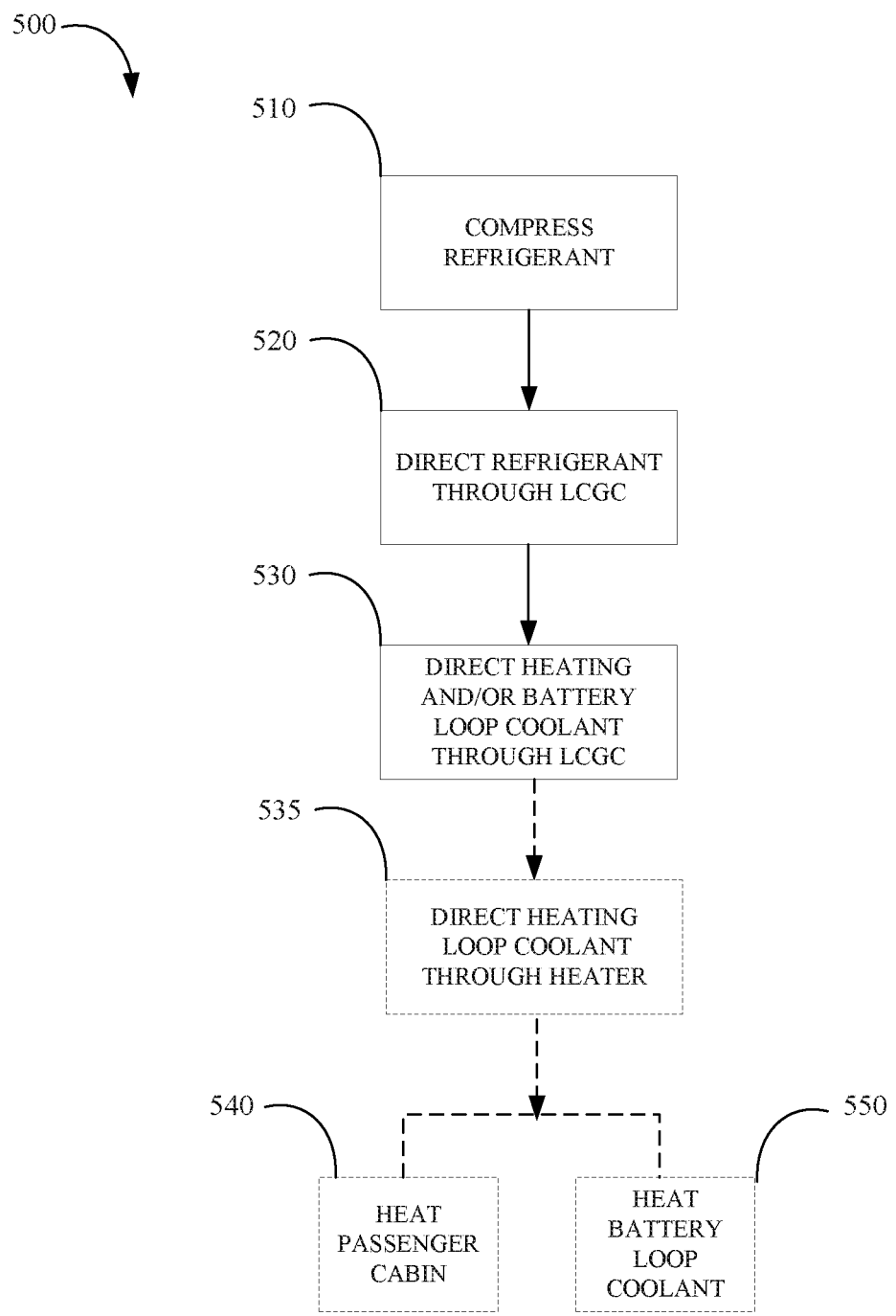
FIG. 5 is a schematic flow chart of one example of a method of increasing the temperature of a heating loop coolant.

Referring to FIG. 5, a process 500 for heating the heating loop 128 and/or the battery loops 134, 134A using the refrigerant loops 124, 124A is illustrated. In step 510, refrigerant is compressed in the refrigerant loops 124, 124A. In one example, the compressor 152 is used to compress the refrigerant to a high pressure and high temperature.

In step 520, the compressed refrigerant flows through the LCGC 160. In the FIG. 1 and FIG. 2 examples, the heating loop coolant from the heating loop 128 draws heat from the refrigerant conduit 154 in the LCGC 160. In the FIG. 2 example, the battery loop coolant from the battery loop 134A may also draw heat from the refrigerant conduit 154 in the LCGC 160.

In step 530, in the FIG. 1 and FIG. 2 examples, the LCGC 160 transfers thermal energy in the form of heat to the heating loop 128, that is, to the heating loop coolant which draws or absorbs the expelled heat, thereby increasing the temperature of the heating loop coolant. In the FIG. 2 example, the LCGC 160 may also transfer thermal energy in the form of heat to the battery loop coolant from the battery loop 134A. The steps 520 and 530 can occur simultaneously.

In optional step 535, applicable to the example in FIGS. 1 and 2, increasing the temperature of the heating loop coolant is possible through use of the electric heater 184 in thermal communication with the heating loop coolant.

In optional step 540, applicable to the example in FIGS. 1 and 2, the increased temperature heating loop coolant can be used to selectively heat the passenger cabin 108. As disclosed above, the HVAC unit 146 includes the heater core 188 in fluid communication with the heating loop 128, and the cabin blower 238 can be used to selectively provide heated air to the passenger cabin 108 by forcing the air across the heater core 188.

In optional, alternative step 550, applicable to the example in FIG. 1, selectively heating the battery loop coolant is possible by sending the increased-temperature heating loop coolant through the heat exchanger 190 in thermal communication with the battery loop coolant. It is understood that additional steps and a different ordering of the disclosed steps in the process 500 is also possible.

Referring to FIGS. 6A-6G, a heat exchanger 600 is configured to exchange or transfer heat between at least three fluids of various loops flowing therethrough. The heat exchanger 600 may, for example, be configured and used as the chiller 166 and/or the LCGC 160 of the thermal management system 100A. For example, the thermal management system 100A may include two of the heat exchangers 600, which are used as the chiller 166 and the LCGC 160 and which may have different configurations.

Figure 6A:
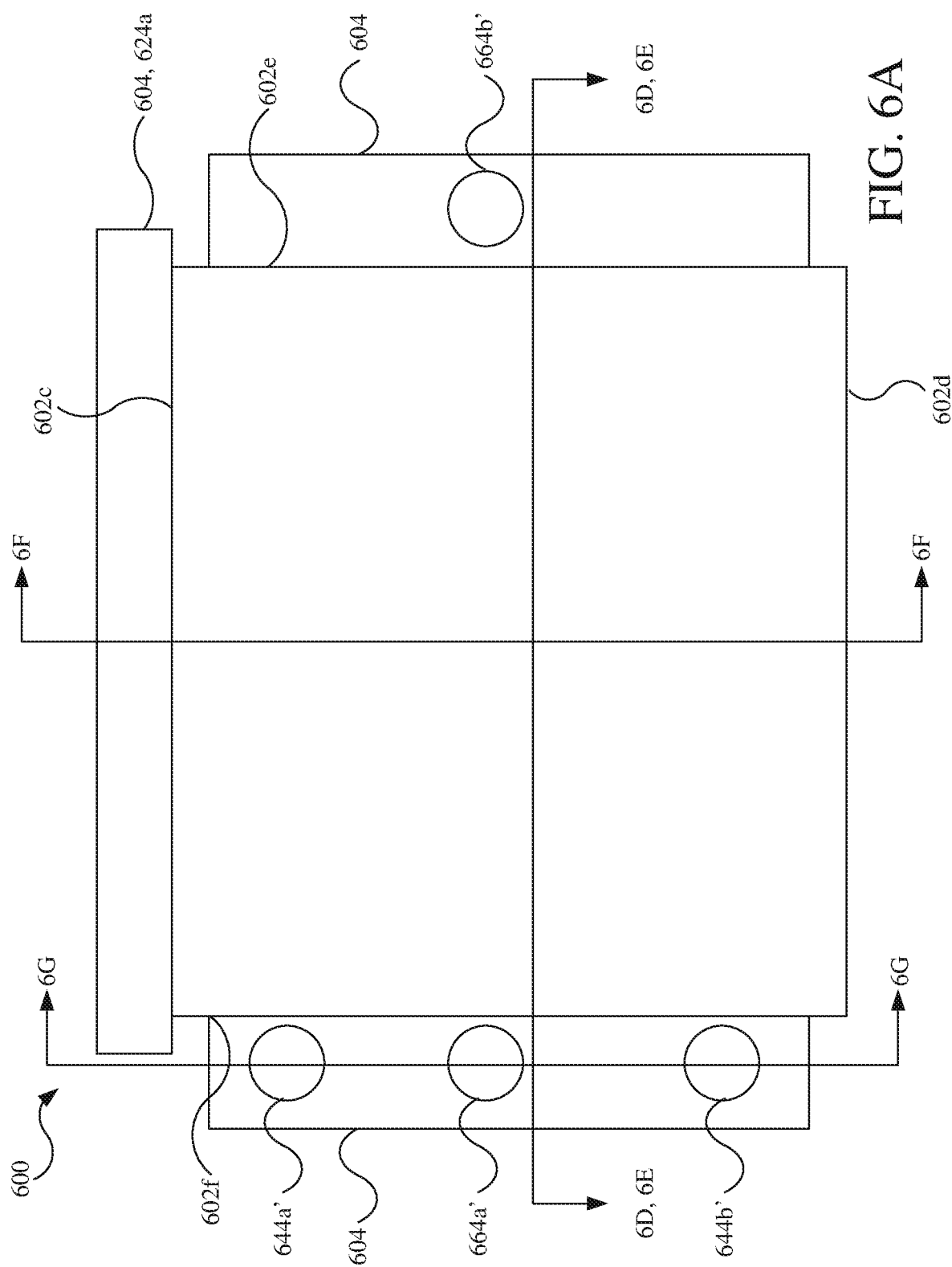
FIG. 6A is a top schematic view of a first embodiment of a heat exchanger.
Figure 6B:
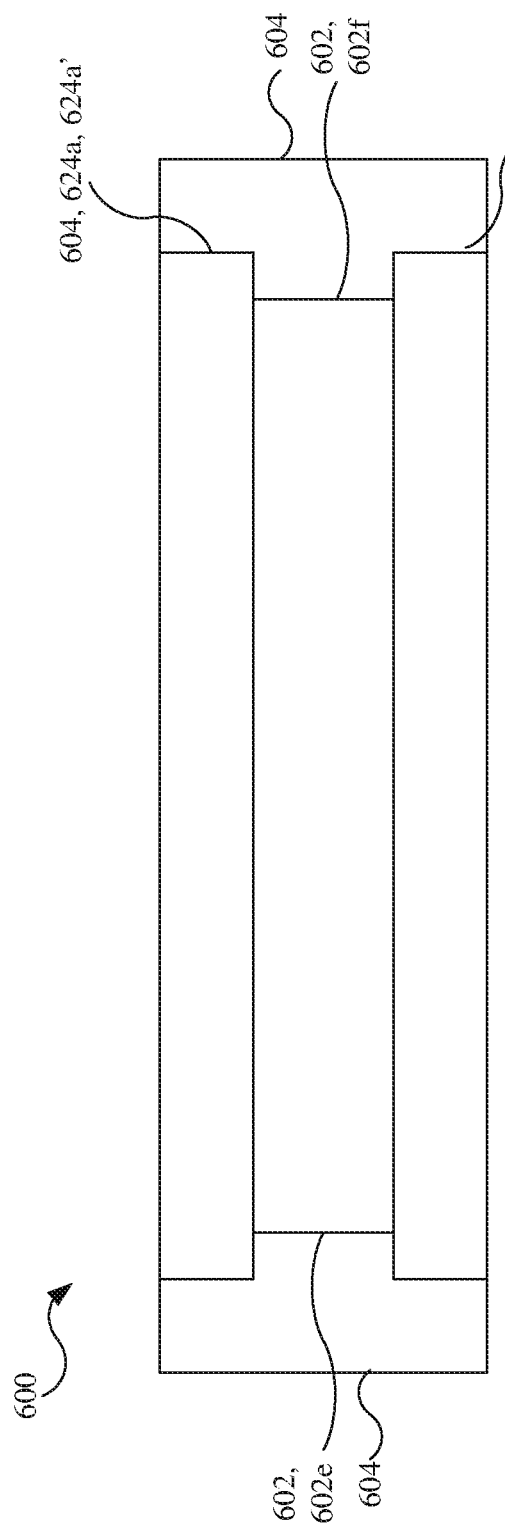
FIG. 6B is a front schematic view of the heat exchanger of FIG. 6A.
Figure 6C:
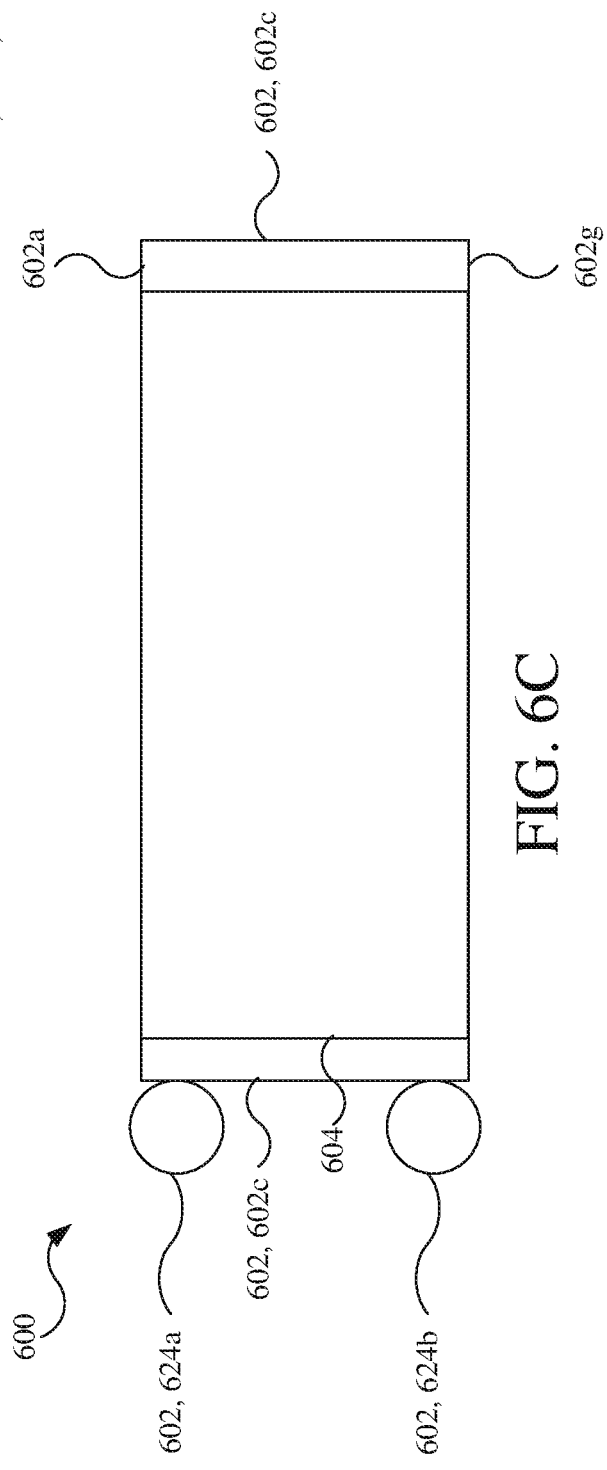
FIG. 6C is a side schematic view of the heat exchanger of FIG. 6A.

Referring to FIGS. 6A-6C, the heat exchanger 600 includes a core 602 (e.g., structure or core structure) that defines passages through which the fluids flow and various manifold structures 604 that connect the heat exchanger 600 to a thermal management system, such as the thermal management system 100A. Referring to FIGS. 6D-6G, more particularly, the heat exchanger 600 includes a refrigerant passage 620 through which refrigerant 620a flows, a primary coolant passage 640 through which a primary coolant 640' flows, and a secondary coolant passage 660 through which a secondary coolant 660' flows. Fluidic separation is maintained between the refrigerant 620a, the primary coolant 640', and the secondary coolant 660', while heat is transferred therebetween. The core 602, including the refrigerant passage 620, the primary coolant passage 640, and the secondary coolant passage 660 thereof, are discussed in further detail below. The manifolds are also discussed in further detail below. In the figures, the passages, the passes thereof, the fluid flowing therethrough, and the direction of the fluid flow may generally be indicated by arrows and/or cross-hatching of which down-right angled cross-hatching indicates flow into the page and up-right angled cross-hatching indicates flow out of the page.

The heat exchanger 600 may be configured, among other considerations, according to a number of passes the refrigerant passage 620, the primary coolant passage 640, and the secondary coolant passage 660 each make through the heat exchanger 600, as well as which passes of the refrigerant passage 620, the primary coolant passage 640, and the secondary coolant passage 660 transfer heat directly between each other. The term "pass" generally refers a portion of a respective passage, or the fluid flowing therethrough, which extends across the width or the length, or substantial majorities thereof of the heat exchanger 600 or the core 602 thereof. A single pass may be cooperatively formed by parallel flows of a fluid (e.g., in different tube structures or cavities, as discussed below). Direct heat transfer is generally considered heat transfer between two fluids without heat transfer through an intermediate fluid but may occur through an intermediate structure (e.g., a wall structure or a tube structure). Direct heat transfer may be referred to as occurring between passes of fluids or between the fluids of the passes. Indirect heat transfer is generally considered heat transfer between two fluids via one or more intermediate fluids.

For example, in the heat exchanger 600, the refrigerant passage 620 includes six refrigerant passes 620a, 620b, 620c, 620d, 620e, 620f, the primary coolant passage 640 includes two primary coolant passes 640a, 640b, and the secondary coolant passage 660 includes one secondary coolant pass 660a. Three of the refrigerant passes 620a, 620b, and 620c extend through and transfer heat directly with a first of the coolant passes 640a, the three other refrigerant passes 620d, 620e, and 620f extend through are transfer heat directly with a second of the primary coolant pass 640b, and the secondary coolant pass 660a transfers heat directly with both the primary coolant passes 640a, 640b. Variations of the heat exchanger 600 are discussed with reference to FIGS. 7-10 below, which include a heat exchanger 700 having three primary coolant passes, and a heat exchanger 800 having seven refrigerant passes, but which may include more or fewer primary coolant passes (e.g., one, four, or five), and more or fewer refrigerant passes (e.g., fewer than six or more than seven).

Figure 6D:
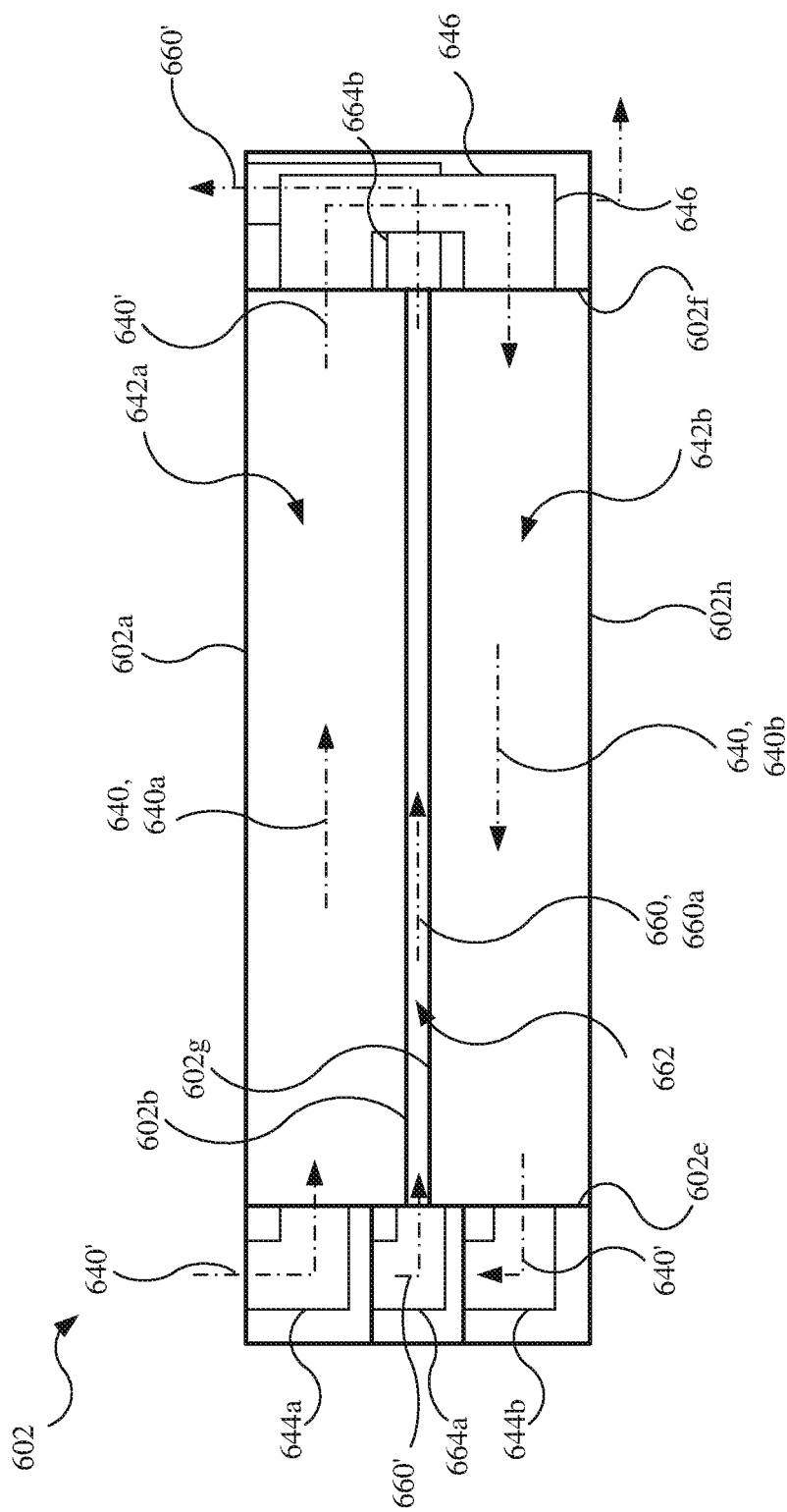
FIG. 6D is a partial cross-sectional view of the heat exchanger taken along line 6D-6D in FIG. 6A and of which a refrigerant passage is omitted for clarity.

The core 602 includes wall structures that define various cavities that form the primary coolant passage 640 and the secondary coolant passage 660. The core 602 additionally includes refrigerant tubes 622 that cooperatively form the refrigerant passage 620 and which extend through the cavities. Referring to FIG. 6D, more particularly, the core 602 includes a first primary coolant cavity 642a and a second primary coolant cavity 642b, which cooperatively form the primary coolant passage 640 and which individually form the first primary coolant pass 640a and the second primary coolant pass 640b, respectively. The first primary coolant cavity 642a and the second primary coolant cavity 642b are fluidically connected, such that the primary coolant 640' flows serially therethrough in opposite directions. The wall structures are formed of a metal material (e.g., aluminum) or other suitable material, which facilitates heat transfer between the primary coolant passage 640 and the secondary coolant passage 660 (e.g., via conduction therethrough). The refrigerant tubes 622 are discussed in further detail below.

The primary coolant cavities 642a, 642b are generally rectangular in cross-section. The first primary coolant cavity 642a is formed by (e.g., defined between) by a top wall 602a and a first intermediate wall 602b opposite and parallel thereto, a first side wall 602c and a second side wall 602d opposite and parallel thereto, and a first end wall 602e and a second end wall 602f. The second primary coolant cavity 642b is also formed by various wall structures of the core 602, which may be common with those wall structures forming the first primary coolant cavity 642a. More particularly, the second primary coolant cavity 642b is formed by a bottom wall 602g and a second intermediate wall 602h opposite and parallel thereto, the first side wall 602c and the second side wall 602d, and the first end wall 602e and the second end wall 602f. The first end wall 602e and/or the second end wall 602f, or portions thereof, may be omitted in some embodiments as discussed in further detail below. The intermediate walls 602b, 602h may, for example, be referred to as a coolant plate, as they facilitate heat transfer between fluids (e.g., the primary coolant 640' and the secondary coolant 660') flowing on either side thereof as discussed in further detail below. The intermediate walls 602b, 602h, as well as the top wall 602a and the bottom wall 602g, each have a width and a length that generally corresponds to the width and the length, respectively, of the core 602 (e.g., between 250 and 290 mm, such as approximately 270 mm). Furthermore, the length of the core 602 and the intermediate walls 602b, 602h, as well as the top wall 602a and the bottom wall 602g, account for the number, width, and spacing of the refrigerant tubes 622 discussed below.

The core 602 may, for example, have a height measured between the top wall 602a and the bottom wall 602g of between approximately 40 and 50 mm (e.g., approximately 46 mm), a width measured between the first side wall 602c and the second side wall 602d of between approximately 250 and 290 mm (e.g., approximately 270 mm), and a length measured between the first end wall 602e and the second end wall 602f of between approximately 250 and 290 mm (e.g., approximately 270 mm). The manifold structures 604 may, for example, be arranged on each side and one end of the core 602 and have widths of between approximately 10 and 40 mm (e.g., approximately 30 mm and 20 mm, respectively). As a result, the heat exchanger 600 may have an overall length measured between the manifold structures 604 on each end (e.g., adjacent the end walls 602e, 602O of between approximately 290 and 370 mm (e.g., approximately 330 mm), and an overall width measured between the manifold structure 604 at one side and the second side wall 602d of between approximately 260 and 310 mm (e.g., approximately 290 mm). The heat exchanger 600 may, however, have different dimensions overall, of the core 602, and/or of the manifold structures 604 (e.g., taller or shorter, wider or narrower, longer or shorter). Furthermore, while the various wall structures are referred to with directional terms for reference purposes, it should be understood that the heat exchanger 600 may, in use, be arranged in different orientations. For example, in one preferred orientation, the heat exchanger 600 may be arranged such that gravity is in the direction of the width (e.g., such that second side wall 602d may be an upper, horizontal surface while, while the top wall 602a and the bottom wall 602g are side, vertical surfaces).

As referenced above, the primary coolant 640' flows serially through the first primary coolant cavity 642a, forming the first primary coolant pass 640a, and then through the second primary coolant cavity 642b, forming the second primary coolant pass 640b. Referring additionally to FIG. 6G, the first primary coolant cavity 642a receives the primary coolant 640' at a first end thereof from an inlet structure (e.g., a primary inlet manifold 644a, as discussed in further detail below), for example, through the first end wall 602e. The primary coolant 640' flows through the first primary coolant cavity 642a in a first direction from the first end to a second end thereof. The primary coolant 640' then flows from the second end of the first primary coolant cavity 642a, for example, through the second end wall 602f, to a first end of the second primary coolant cavity 642b. The first primary coolant cavity 642 and the second primary coolant cavity 642b may, for example, be fluidically connected by one or more primary coolant tubes 646 extending therebetween (e.g., between the second end and the first end, respectively, thereof), which may be arranged in or formed by one of the manifold structures 604. The primary coolant 640' then flows through the second primary coolant cavity 642b in a second direction from the first end to the second end thereof, which is substantially opposite the first direction. The primary coolant 640' is expelled from the second end of the second primary coolant cavity 642b, for example, through the first end wall 602e, to an outlet structure (e.g., a primary outlet manifold 644*b*, as discussed in further detail below). The first primary coolant cavity 642*a* and the second primary coolant cavity 642*b* may be fluidically connected in other suitable manners, for example, by a chamber (e.g., formed by one of the manifold structures 604).

The secondary coolant cavity 662 is arranged between the primary coolant cavities 642*a*, 642*b* to facilitate heat transfer between the secondary coolant 660' and the primary coolant 640', respectively, flowing therethrough. More particularly, the secondary coolant cavity 662 is defined between the first intermediate wall 602*b*, which also defines the first primary coolant cavity 642*a*, and the second intermediate wall 602*h*, which also defines the second primary coolant cavity 642*b*. Heat is, thereby, transferred between the secondary coolant 660' and the primary coolant 640' in the first primary coolant cavity 642*a* and the second primary coolant cavity 642*b* via the first intermediate wall 602*b* and the second intermediate wall 602*h*. In this arrangement, the secondary coolant passage 660, in effect, insulates the first primary coolant pass 640*a* from the second primary coolant pass 664*b* to prevent direct heat transfer therebetween through a wall structure.

The secondary coolant cavity 662 is generally rectangular in cross-section. The secondary coolant cavity 662 may, for example, have similar (e.g., substantially equal) cross-sectional dimensions in one plane (e.g., width and length) as the primary coolant cavities 642*a*, 642*b*, while having a different dimension in a perpendicular plane (e.g., having a lesser height). The secondary coolant cavity 662, as described above, is formed by the first intermediate wall 602*b* and the second intermediate wall 602*h*, and additionally by the first side wall 602*c* and the second side wall 602*d*, and the first end wall 602*e* and the second end wall 602*f*.

The secondary coolant 660' flows through the secondary coolant cavity 662 in a single pass. The secondary coolant cavity 662 receives the secondary coolant 660' at a first end thereof from an inlet structure (e.g., a secondary inlet manifold 664*a*, as discussed in further detail below), for example, through the first end wall 602*e*. The secondary coolant 660' then flows through the secondary coolant cavity 662 from the first end to a second end thereof in the same direction (i.e., the first direction) as the primary coolant 640' flows through the first primary coolant cavity 642*a*. The secondary coolant 660' is expelled from the second end of the primary coolant cavity 642*a*, for example, through the second end wall 602*f*, to an outlet structure (e.g., a secondary outlet manifold 664*b*, as discussed in further detail below). Alternatively, the secondary coolant 660' may flow through the secondary coolant cavity 662 in the same direction as the primary coolant 640' flows through the second primary coolant cavity 642*b* (i.e., in the second direction), or may flow perpendicular thereto (e.g., between the first side wall 602*c* and the second side wall 602*d*).

Figure 6E:
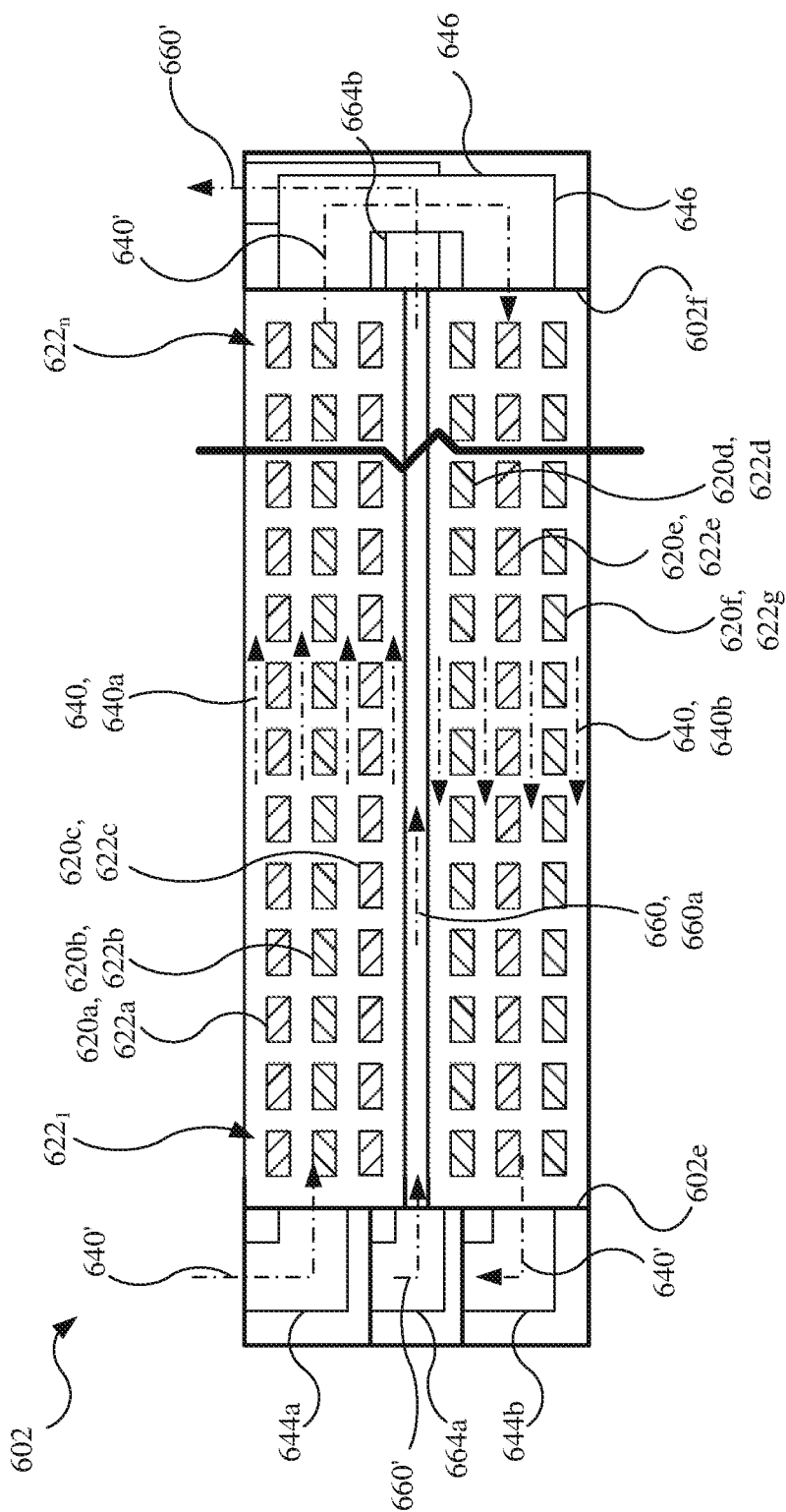
FIG. 6E is a cross-sectional view of the heat exchanger taken along line 6E-6E in FIG. 6A and of which the refrigerant passage is shown.
Figure 6F:
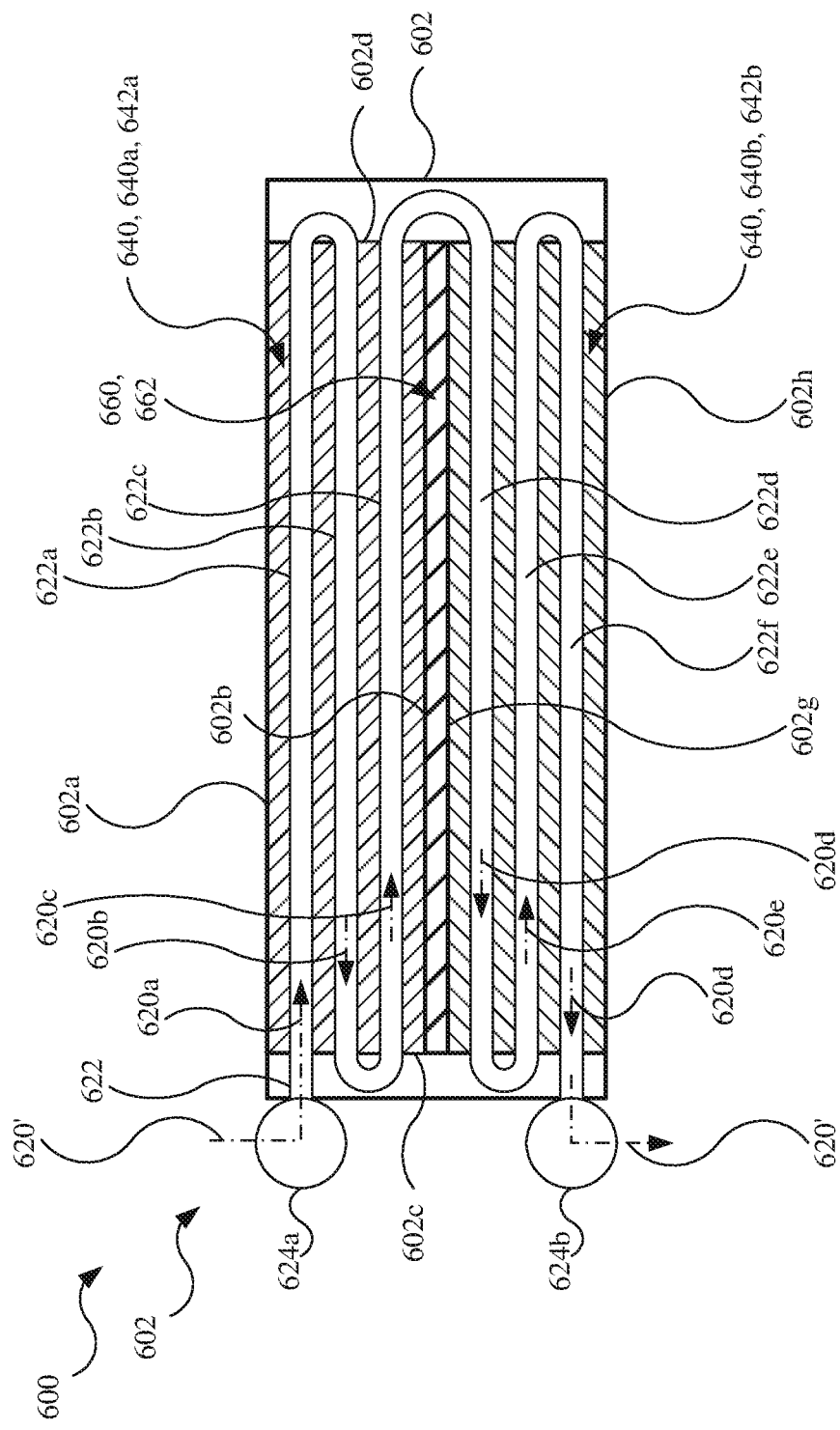
FIG. 6F is a cross-sectional view of the heat exchanger taken along line 6F-6F in FIG. 6A.

Referring to FIGS. 6E-6F, the refrigerant passage 620 is cooperatively formed by the refrigerant tubes 622 (e.g., n number of refrigerant tubes 622$_1$ to 622$_n$) that are spaced apart laterally (e.g., along the first side wall 602*c*) and extend substantially parallel with each other. The heat exchanger 600 may, for example, include between 20 and 60 refrigerant tubes 622 (e.g., between 25 and 35 refrigerant tubes 622, such as 28 refrigerant tubes 622). It should be noted that in FIG. 6E only 13 refrigerant tubes 622 are illustrated for clarity purposes, while the vertical jagged line indicates that additional refrigerant tubes 622 may be included and that the core 602 may have different dimensions to accommodate additional refrigerant tubes 622. The refrigerant tubes 622 may also be referred to as refrigerant lines.

The refrigerant tubes 622 extend through the core 602 in a serpentine manner to form the multiple refrigerant passes. More specifically, each of the refrigerant tubes 622 includes six tube segments 622*a*, 622*b*, 622*c*, 622*d*, 622*e*, and 622*f* (e.g., straight segments) through which the refrigerant 620' flows serially. The tube segments 622*a*-622*f* extend through the first primary coolant cavity 642*a* and the second primary coolant cavity 642*b* from the first side wall 602*c* to the second side wall 602*d*, for example, parallel with the top wall 602*a* and the first end wall 602*e*. For example, in the heat exchanger 600, three of the tube segments 622*a*, 622*b*, and 622*c* extend through the first primary coolant cavity 642*a*, while the other three of the tube segments 622*d*, 622*e*, and 622*f* extend through the second primary coolant cavity 642*b*. The refrigerant tubes 622 additionally include connecting segments (e.g., curved segments; not labeled), which extend outside the primary coolant cavities 642*a*, 642*b* (e.g., through the first side wall 602*c* and the second side wall 602*d*) and interconnect the tube segments 622*a*-622*f* for the refrigerant 620' to flow serially therethrough. The refrigerant tubes 622 may protrude through the first side wall 602*c* and the second side wall 602*d* and, for example, be supported thereby and/or be sealingly connected thereto (e.g., to prevent the primary coolant 640' and the secondary coolant 660' from leaking between the side walls 602*c*, 602*d* and the refrigerant tubes 622). Alternatively, the refrigerant tubes 622, including the curved segments, may be contained within the primary coolant cavities 642*a*, 642*b* (i.e., between the first side wall 602*c* and the second side wall 602*d*) with, for example, only the first and the second end thereof (i.e., formed by the first and the sixth of the tube segments 622*a*, 622*f* extending through the first side wall 602*c*). The tube segments 622*a*-622*f* have a length that generally corresponds to a width of the core 602 (e.g., between 250 and 290 mm, such as approximately 270 mm).

The refrigerant 620' flows through the refrigerant passage 620 in six passes (i.e., formed by the tube segments 622*a*-622*f*) back and forth in opposing directions, which are perpendicular to the first direction and the second direction that the primary coolant 640' flows through the primary coolant cavities 642*a*, 642*b*. The refrigerant tubes 622 each receive the refrigerant 620' at a first end thereof (e.g., formed by a first of the tube segments 622*a*) from an inlet structure (e.g., a refrigerant inlet manifold 664*a*, as discussed in further detail below), for example, through the first side wall 602*c*. The refrigerant 620' then flows serially through the tube segments 622*a*-622*f* and the connecting segments therebetween in a serpentine manner (i.e., back and forth directions) to a second end thereof (e.g., formed by a sixth or last of the tube segments 622*f*). The refrigerant 620' is expelled from the second ends of the refrigerant tubes 622, for example, through the second side wall 602*d*, to an outlet structure (e.g., a refrigerant outlet manifold 624*b*).

Figure 6H:
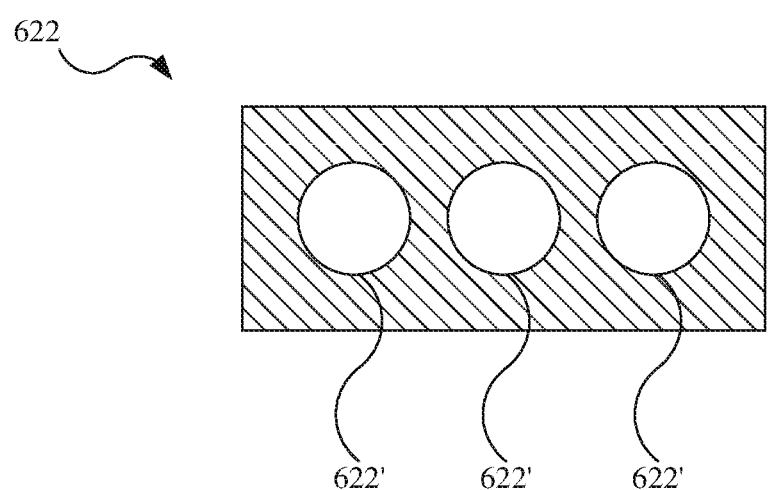
FIG. 6H is a cross-sectional view of a refrigerant tube of the refrigerant passage of the heat exchanger of 6A.

The refrigerant tubes 622 are, for example, configured to carry the refrigerant 620' (e.g., $CO_2$, such as R744), under high pressure. The refrigerant tubes 622 may, for example, each be continuously formed of a metal material (e.g., aluminum), for example, being extruded and bent to form the tube segments 622*a*-622*f* and the connection segments therebetween. Referring to FIG. 6H, in one example, each of the refrigerant tubes 622 includes therein a series of channels 622' (e.g., channels, for example, three) that are spaced apart laterally and extend therethrough from the first end to the second end thereof. In cross-section, the refrigerant tube 622 may be substantially rectangular in cross-section, for example, having a width of approximately 6.3 mm and a height of approximately 1.4 mm, or be larger or smaller in width or height. As is shown, the larger dimension of the refrigerant tube 622 (e.g., the width as shown) may be arranged in the primary coolant cavities 642a, 642b substantially parallel with the direction of flow of the primary coolant 640'. The channels 622' may, for example, be circular and have a diameter of between 0.5 and 1.3 mm (e.g., 1.3 mm), or may have another shape (e.g., triangular, rectangular, oval, etc.) and/or have another size. The refrigerant tube 622 may be still configured in other manners, for example, having a few or more channels 622' (e.g., one, two, four, or more), have a different cross-sectional shape (e.g., circular), and/or be configured for other fluids (e.g., a low pressure refrigerant or coolant). As a result, the refrigerant tubes 622 may collectively include, for example, between approximately 60 and 180 the channels 622' (e.g., 84 of the channels 622'), which cooperatively form the refrigerant passage 620.

With the refrigerant tubes 622 extending through the primary coolant cavities 642a, 642b, the primary coolant 640' flows in contact therewith, such that heat may be transferred between the refrigerant 620' and the primary coolant 640' via the material forming the refrigerant tubes 622. Moreover, heat may be transferred indirectly between the refrigerant 620' and the secondary coolant 660' via the primary coolant 640', which exchanges heat directly with the refrigerant 620' and the secondary coolant 660'.

Additionally, with the primary coolant cavities 642a, 642b having the refrigerant tubes 622 (i.e., the tube segments 622a-622f thereof) extend therethrough and the secondary coolant cavity 662 being arranged therebetween, the heat exchanger 600 may be considered to have fluid layers. The heat exchanger 600 includes 15 fluid layers, which include six refrigerant layers (i.e., formed by the six tube segments 622a-622f), eight primary coolant layers (i.e., defined above, below, and between the six tube segments 622a-622f within the primary coolant cavities 642a, 642b, and which may have the same or different height as each other), and one secondary coolant layer (i.e., defined by the secondary coolant cavity 662, which may have the same or different height as the primary coolant layers).

The refrigerant inlet manifold 624a is configured to connect to a refrigerant input, for example at a refrigerant inlet 624a', and is connected to the refrigerant passage 620. The refrigerant inlet manifold 624a may be formed by and/or contained in one of the manifold structures 604. The refrigerant inlet manifold 624a is, for example, configured as a tubular structure that is connected to the first ends (e.g., the first tube segments 622a) each of the refrigerant tubes 622 that cooperatively form the refrigerant passage 620. The refrigerant inlet manifold 624a receives the refrigerant 620' from the refrigerant input and passes the refrigerant 620' to the refrigerant passage 620 and, in particular, distribute the refrigerant 620' to each of the refrigerant tubes 622.

The refrigerant outlet manifold 624b is configured to connect to a refrigerant output, for example at a refrigerant outlet 624b'. The refrigerant outlet manifold 624b is a tubular structure that is connected to the second ends (e.g., the sixth tube segments 622f) of each of the refrigerant tubes 622. The refrigerant outlet manifold 624b may be formed by one of the manifold structures 604. The refrigerant outlet manifold 624b receives the refrigerant 620' from the refrigerant tubes 622 and passes the refrigerant 620' to the refrigerant output. The refrigerant input and the refrigerant output may be a common refrigerant loop. For example, when the heat exchanger 600 is configured and used as either the chiller 166 or the LCGC 160 in the thermal management system 100A, the refrigerant passage 620 is connected to the refrigerant loop 124A via the refrigerant inlet manifold 624a and the refrigerant outlet manifold 624b.

As shown, the refrigerant inlet manifold 624a and the refrigerant outlet manifold 624b are arranged on a common side of the heat exchanger 600, which corresponds to an even number refrigerant passes (i.e., six as shown) of the refrigerant passage 620. The refrigerant inlet manifold 624a and the refrigerant outlet manifold 624b each extend substantially parallel with and adjacent to the first side wall 602c of the core 602. The refrigerant inlet manifold 624a and the refrigerant outlet manifold 624b are each made of a compatible material (e.g., aluminum) for being connected to the refrigerant tubes 622 and reliably handle the pressure associated with refrigerant 620'. The refrigerant inlet manifold 624a and the refrigerant outlet manifold 624b are additionally configured to connect to the refrigerant input and refrigerant output, respectively, in a suitable manner, such as with releasable connections (e.g., fittings) or with permanent connections (e.g., brazed).

The primary inlet manifold 644a is configured to connect to a primary coolant input, for example at a primary inlet 644a', and is connected to the primary coolant passage 640. The primary inlet manifold 644a is, for example, configured as a chamber in fluid communication with the first end of the first primary coolant cavity 642a, for example, through one or more apertures (not labeled) in the first end wall 602e of the core 602. Alternatively, the first end wall 602e may be omitted. The primary inlet manifold 644a receives the primary coolant 640' from the primary coolant input and passes the primary coolant 640' to the primary coolant passage 640 and, may additionally, distribute the primary coolant 640' across the first end of the first primary coolant cavity 642a.

The primary outlet manifold 644b is configured to connect to a primary coolant output, for example at a primary outlet 644b'. The primary outlet manifold 644b is, for example, configured as another chamber in fluid communication with the second end of the second primary coolant cavity 642b. The primary outlet manifold 644b receives the primary coolant 640' from the second primary coolant cavity 642b and passes the primary coolant 640' to the primary coolant output. The primary coolant input and the primary coolant output may be a common coolant loop. For example, when the heat exchanger 600 is configured and used as the chiller 166, the primary coolant passage 640 is connected to the cooling loop 130 via the primary inlet manifold 644a and the primary outlet manifold 644b. When instead configured and used as the LCGC 160 of the thermal management system 100A, the primary coolant passage 640 is connected to the heating loop 128 via the primary inlet manifold 644a and the primary outlet manifold 644b.

As shown, the primary inlet 644a' and the primary outlet 644b' are arranged on a common side of the heat exchanger 600, which corresponds to an even number of primary coolant passes (i.e., two as shown) of the primary coolant passage 640. It may also be preferred to orient the primary inlet 644a' to be lower than the primary outlet 644b' (e.g., when installed in the thermal management system 100A). The primary inlet manifold 644a and the primary outlet manifold 644b each extend substantially parallel with and adjacent to the first end wall 602e of the core 602. The primary inlet manifold 644a and the primary outlet manifold 644b are each made of a compatible material (e.g., aluminum) for being connected to the core 602 and for carrying the primary coolant 640' therein (e.g., 50/50 mixture of water and ethylene glycol), and may be formed separately or continuously with other portions of the core 602. The primary inlet manifold 644a and the primary outlet manifold 644b are additionally configured to connect to the primary coolant input and primary coolant output, respectively, in a suitable manner, such as with releasable connections (e.g., fittings) or with permanent connections (e.g., brazed).

The secondary inlet manifold 664a is configured to connect to a secondary coolant input, for example at a secondary inlet 664a', and is connected to the secondary coolant passage 660. The secondary inlet manifold 664a is, for example, configured as a chamber in fluid communication with the first end of the secondary coolant cavity 662a, for example, through one or more apertures (not labeled) in the first end wall 602e of the core 602. Alternatively, the first end wall 602e may be omitted. The secondary inlet manifold 664a receives the secondary coolant 660' from the secondary coolant input and transfers the secondary coolant 660' to the secondary coolant passage 660 and, may additionally, distribute the secondary coolant 660' across the first end of the secondary coolant cavity 662.

The secondary outlet manifold 664b is configured to connect to a secondary coolant output, for example at a secondary outlet 664b', and is connected to the secondary coolant passage 660. The secondary outlet manifold 664b is, for example, configured as another chamber in fluid communication with the second end of the secondary coolant cavity 662. The secondary outlet manifold 664b receives the secondary coolant 660' from the secondary coolant cavity 662 and transfers the secondary coolant 660' to the secondary coolant output. The secondary coolant input and the secondary coolant output may be a common coolant loop. For example, when the heat exchanger 600 is configured and used as either the chiller 166 or the LCGC 160, the secondary coolant passage 660 is connected to the battery loop 134A via the secondary inlet manifold 664a and the secondary outlet manifold 664b. It may be preferred to locate the secondary inlet 664a' below the secondary outlet 664b', for example, in the thermal management system 100A.

As shown, the secondary inlet manifold 664a and the secondary outlet manifold 664b are arranged on different sides of the heat exchanger 600, which corresponds to an odd number of secondary coolant passes 660a (i.e., one as shown) of the secondary coolant passage 660. The secondary inlet manifold 664a and the secondary outlet manifold 664b extend substantially parallel with and adjacent to the first end wall 602e and the second end wall 602f, respectively, of the core 602. The secondary inlet manifold 664a and the secondary outlet manifold 664b are each made of a compatible material (e.g., aluminum) for being connected to the core 602 and for carrying the secondary coolant 660' therein (e.g., a 50/50 mixture of water and ethylene glycol), and may be formed separately or continuously with other portions of the core 602 and/or the primary inlet manifold 644a and/or the primary outlet manifold 644b. The secondary inlet manifold 664a and the secondary outlet manifold 664b are additionally configured to connect to the secondary coolant input and secondary coolant output, respectively, in a suitable manner, such as with releasable connections (e.g., fittings) or with permanent connections (e.g., brazed).

Additionally, the various manifolds and passages may be configured for the primary refrigerant 620' and the primary coolant 640' to transfer heat therebetween either as both enter the heat exchanger 600 or as one fluid enters and the other fluid exits the heat exchanger 600. For example, when configured and used as the LCGC 160, heat is transferred from the refrigerant 620' to the primary coolant 640' and in turn to the secondary coolant 660'. The refrigerant 620' decreases in temperature flowing therethrough and, thereby, has a maximum refrigerant temperature at the refrigerant inlet 624a' and a minimum temperature at the refrigerant outlet 624b'. The primary coolant 640' and the secondary coolant 660' each increase in temperature flowing through the heat exchanger 600 to have minimum temperatures at the respective inlets 644a', 664a' and maximum temperatures at the respective outlets 644b', 664b'. The manifolds and passages may be arranged such that the highest temperature refrigerant 620' (i.e., in those tube segments 622a-622c after entering through the inlet 624a') transfers heat to that primary coolant 640' with the lowest temperature (i.e., in the first primary coolant cavity 642a after entering through the inlet 644a') or that primary coolant 640' with the highest temperature (i.e., in the second primary coolant cavity 642b prior to exiting through the outlet 644b'). Conversely, when configured and used as the chiller 166, heat is transferred from the primary coolant 640' to the refrigerant 620'. The heat exchanger 600 may be configured for the highest temperature primary coolant 640' (i.e., in the first primary coolant cavity 642a after entering through the inlet 644a') to transfer heat to the lowest temperature refrigerant 620' (i.e., in those tube segments 622a-622c after entering through the inlet 624a') or the highest temperature refrigerant 620' (i.e., in those tube segments 622d-622f before exiting through the outlet 624b').

Figure 7:
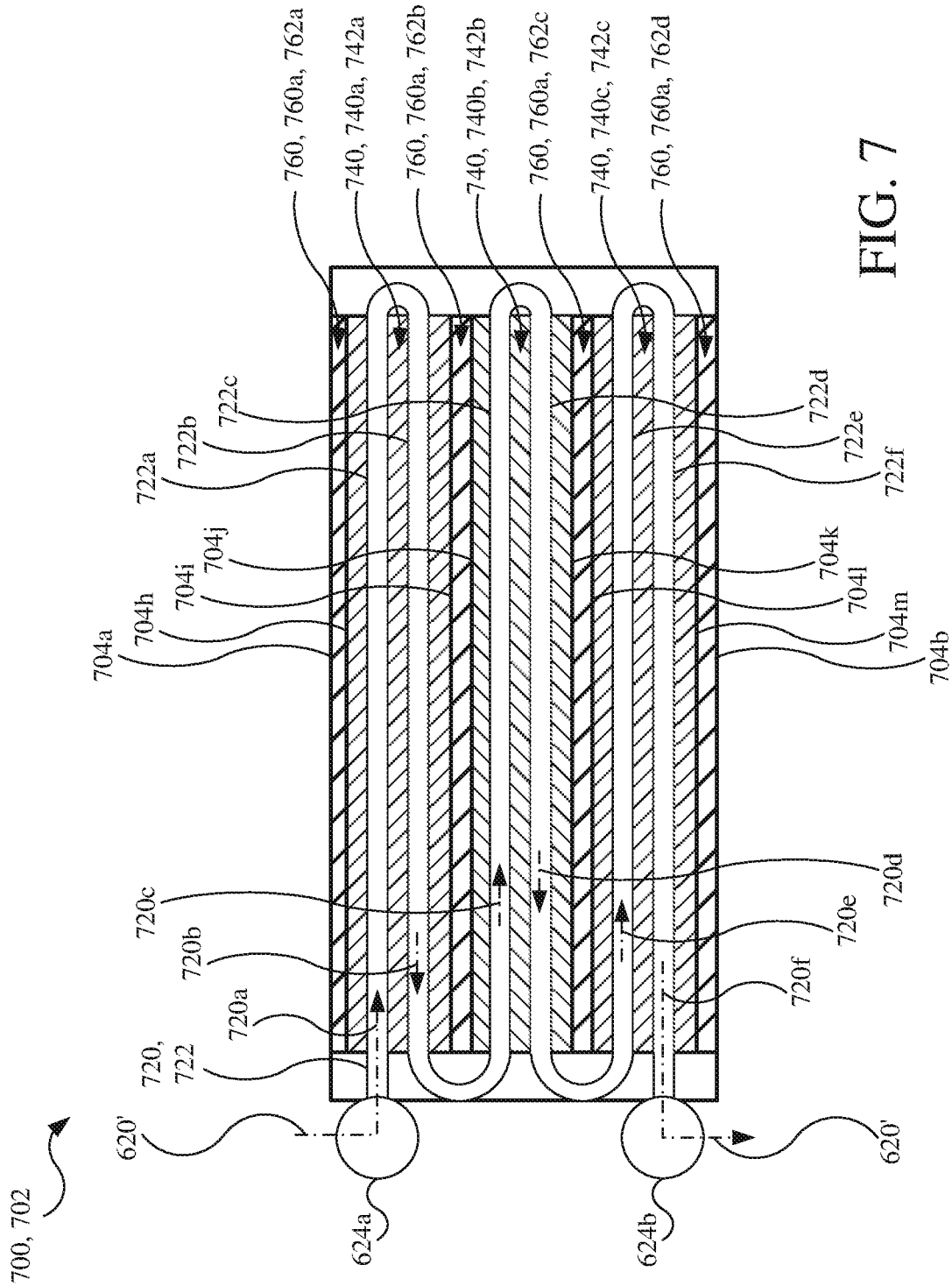
FIG. 7 is a cross-sectional view of another embodiment of a heat exchanger, which is taken similar to the cross-sectional view of FIG. 6F.

Referring to FIG. 7, a heat exchanger 700 is a variation of the heat exchanger 600. The heat exchanger 700 may, for example, be used as the chiller 166 in the thermal management system 100A and/or use as the LCGC 160 in the thermal management system 100A. For example, in one preferred embodiment, the thermal management system 100A may include the heat exchanger 600 as the chiller 166 (e.g., transfer heat from the battery loop coolant to the refrigerant, for example, indirectly via the cooling loop coolant, thereby decreasing the temperature of the battery loop coolant) and may include the heat exchanger 700 as the LCGC 160 (e.g., to transfer heat to the battery loop coolant from the refrigerant, for example, indirectly via the heating loop coolant, thereby increasing the temperature of the battery loop coolant).

For brevity, differences between the heat exchanger 600 and the heat exchanger 700 are described below. For further understanding of the heat exchanger 700, refer to the discussion of the heat exchanger 600 above. The heat exchanger 700 includes six refrigerant passes 720a-720f, three primary coolant passes 740a-740c, and one secondary coolant pass 760a. Two of the refrigerant passes 720a-720f extend through and transfer heat directly with one of the three primary coolant passes 740a-740c. The three primary coolant passes 740a-740c additionally transfer heat directly with the secondary coolant pass 760a.

For example, the heat exchanger 700 includes a core 702, along with a refrigerant passage 720, a primary coolant passage 740, and a secondary coolant passage 760. The refrigerant passage 720 is formed by a series of refrigerant tubes 722. The refrigerant passage 720 includes six passes 720a-720f, which are each formed by tube segments 722a-722f of the refrigerant tubes 722.

The primary coolant passage 740 includes three passes 740a, 740b, 740c, which are, respectively, formed by a first cavity 742a (defined between first and second intermediate walls 704h, 704i of the core 702), a second cavity 742b (defined between third and fourth intermediate walls 704j, 704k), and a third cavity 742c (defined between the fifth and sixth intermediate walls 704l, 704m). The second cavity 742b is connected to the first cavity 742a and the third cavity 742c for serial flow therethrough (e.g., with connecting tubes or another suitable manner, as described above with respect to the primary coolant passage 640). The first and third passes 740*a*, 740*c* flow in a first direction (i.e., into the page as indicated by down-right angled cross-hatching), while the second pass 740*b* flows opposite the first direction (i.e., out of the page as indicated by up-right angled cross-hatching). A primary inlet manifold may be configured substantially similar to the primary inlet manifold 644*a* described previously, while a primary outlet manifold may be configured substantially similar to the second primary outlet manifold 644*b* but is arranged on an opposite side of the heat exchanger 700 relative to the primary inlet manifold.

The secondary coolant passage 760 forms a single pass 760*a*, which is cooperatively formed by four secondary coolant cavities 762*a*-762*d* (i.e., parallel flow occurs through the four secondary coolant cavities 762*a*-762*d*). The four secondary coolant cavities 762*a*-762*d* are, respectively, defined between a top wall 704*a* and the first intermediate wall 704*h*, between the second and third intermediate walls 704*i*, 704*j*, between the fourth and fifth intermediate walls 704*k*, 704*lk*, and between the sixth intermediate wall 704*m* and a bottom wall 704*b* of the core 702. A secondary inlet manifold and a secondary outlet manifold (not shown) are, respectively, configured to, respectively, distribute and collect the secondary coolant (not labeled) to and from the four secondary coolant cavities 762*a*-762*d*.

Heat transfer occurs directly between two of the refrigerant passes 720*a*-720*f* and each of the three primary coolant passes 740*a*-740*c* (i.e., through the material forming the refrigerant tubes 722). More particularly, two of the tube segments 722*a*-722*f* extend through each of the primary coolant cavities 742*a*-742*c*.

Heat transfer additionally occurs directly between the secondary coolant pass 760*a* in two of the secondary coolant cavities 762*a*-762*d* and each of the primary coolant passes 740*a*-740*c*. More particularly, two of the secondary coolant cavities 762*a*-762*d* surround each of the primary coolant cavities 742*a*-742*c* and share a common one of the intermediate walls 704*h*-704*m* therewith. For example, the secondary coolant pass 760*a* flows through the first primary coolant cavity 742*a*, which is surrounded by the first and second secondary coolant cavities 762*a*, 762*b* and shares the first and second intermediate walls 704*h*, 704*i*, respectively, therewith.

Furthermore, the first and fourth secondary coolant cavities 762*a*, 762*d* are defined, in part, by the top wall 704*a* and the bottom wall 704*b*, which may be exposed to ambient air. Thus, heat may additionally be transferred between the secondary coolant pass 760*a* flowing through the first and fourth secondary coolant cavities 762*a*, 762*d* and ambient air. Moreover, the secondary coolant cavities 762*a*, 762*d* may insulate the primary coolant passage 740 from ambient air, which may prevent condensation that might otherwise form on outer surfaces of the heat exchanger 700 from humidity of the ambient air condensing as heat is transferred from the ambient air to the primary coolant 740'.

As a result of the configuration described above and shown in FIG. 7, the heat exchanger 700 includes 19 fluid layers, which include six refrigerant layers (i.e., formed by the six tube segments 722*a*-722*g*), nine primary coolant layers (i.e., formed in the primary coolant cavities 742*a*-742*c* between and outside of the six tube segments 722*a*-722*g* extending therethrough), and four secondary coolant layers (i.e., formed by the secondary coolant cavities 762*a*-762*d*, which extend outside of and between the three primary coolant cavities 742*a*-742*c*).

The core 702 may, for example, have a height of between approximately 55 and 65 mm (e.g., approximately 60 mm), a width of between approximately 250 and 290 mm (e.g., approximately 270 mm), and/or a length of between approximately 190 and 230 mm (e.g., approximately 210 mm). The heat exchanger 700, accounting for manifold structures configured as described previously, may have an overall height of between 55 and 65 mm (e.g., approximately 60 mm), an overall width of between 290 and 370 mm (e.g., approximately 330 mm), and an overall length of between approximately 200 and 270 mm (e.g., approximately 230 mm). The heat exchanger 700 and the core 702 may, however, be configured with other dimensions. Furthermore, in preferred usage scenarios, gravity may extend in the direction of the width (e.g., in either direction in which the refrigerant 720' flows through the refrigerant passage 720) or in the direction of the length (e.g., in either direction in which the primary coolant 740' flows through the primary coolant passage 740).

Figure 8:
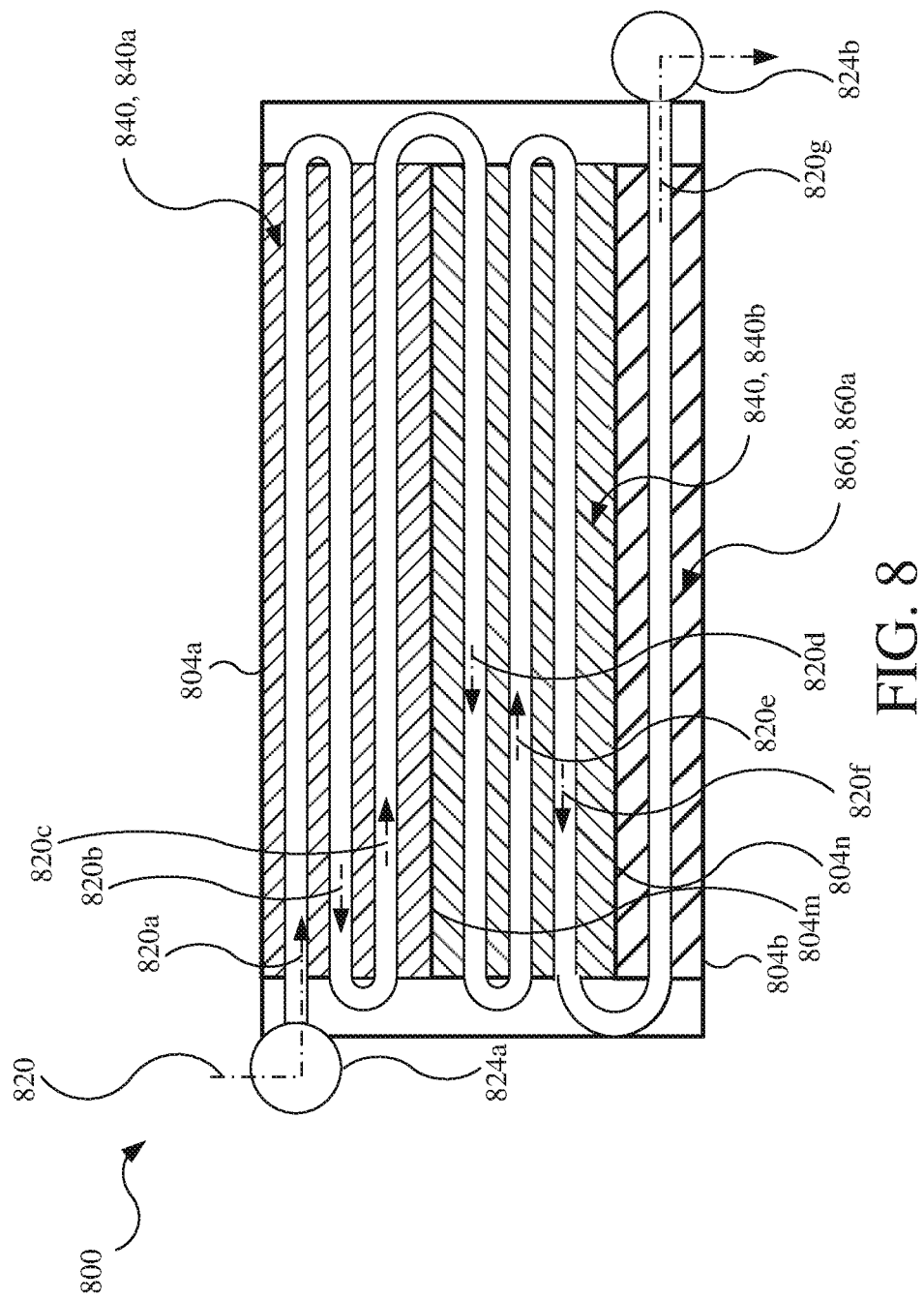
FIG. 8 is a cross-sectional view of another embodiment of a heat exchanger, which is taken similar to the cross-sectional view of FIG. 6F.

Referring to FIG. 8, a heat exchanger 800 is a variation of the heat exchanger 600. For brevity, differences between the heat exchanger 600 and the heat exchanger 800 are described below. For further understanding of the heat exchanger 800, refer to the discussion of the heat exchanger 600 above. The heat exchanger 800 includes a refrigerant passage 820 having seven refrigerant passes 820*a*-820*g*, a primary coolant passage 840 having two primary coolant passes 840*a*-840*b*, and one secondary coolant passage 860 having one secondary coolant pass 860*a*. By having an odd number of refrigerant passes (i.e., seven), the refrigerant 820' enters and exits the heat exchanger 800, respectively, through a refrigerant inlet manifold 824*a* and a refrigerant outlet manifold 824*b* that are positioned on opposites sides of the heat exchanger 800.

Three of the refrigerant passes 820*a*-820*f* extend through and exchange heat directly with one of the two primary coolant passes 840*a*-840*b*. Another of the refrigerant passes 820*g* extends through and transfer heat directly with the secondary coolant pass 860*a*. The first primary coolant pass 840*a* and the second primary coolant pass 840*b* may exchange heat directly with each other (e.g., by sharing a intermediate wall 840*m* common therebetween). The second primary coolant pass 840*b* and the secondary coolant pass 860*a* may additionally exchange heat directly with each other (e.g., by sharing another intermediate wall 804*n* common therebetween). The first primary coolant pass 840*a* may additionally exchange heat directly with ambient air (e.g., through a top wall 804*a*). The secondary coolant pass 860*a* may additionally exchange heat directly with ambient air via a bottom wall 804*b*).

As a result, the heat exchanger 800 may include 17 fluid layers, which include seven refrigerant layers (i.e., formed by the seven refrigerant passes 820*a*-820*g*), eight primary coolant layers (i.e., formed by the two primary coolant passes 840*a*-840*b* above, below, and between six of the refrigerant passes 820*a*-820*f*), and two secondary coolant layers (i.e., formed by the secondary coolant pass 860*a* above and below the seventh refrigerant pass 820*g*).

Figure 9:
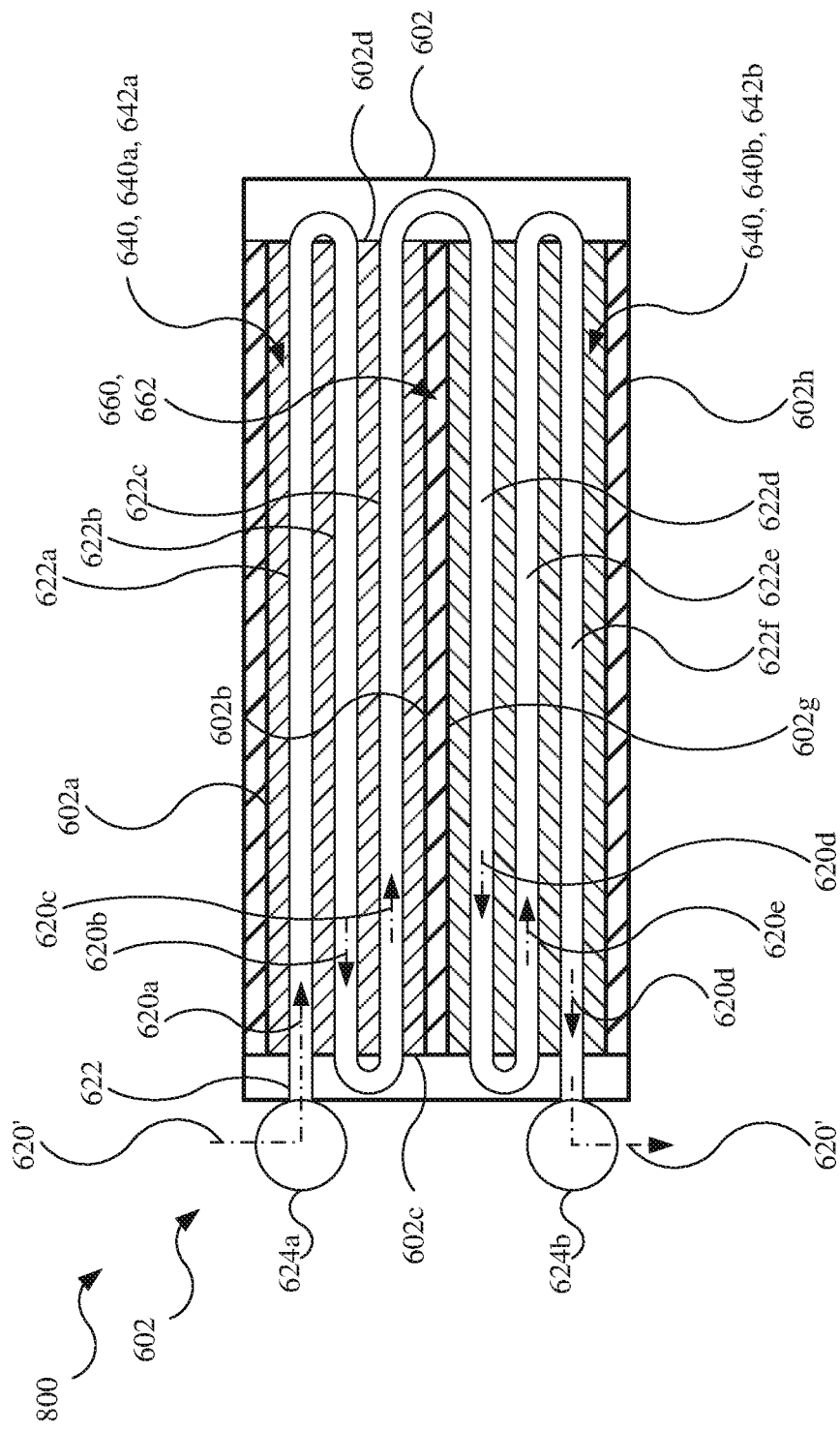
FIG. 9 is a cross-sectional view of another embodiment of a heat exchanger, which is taken similar to the cross-sectional view of FIG. 6F.

Referring to FIG. 9, a heat exchanger 900 is a variation of the heat exchanger 600. For brevity, differences between the heat exchanger 600 and the heat exchanger 900 are described below. For further understanding of the heat exchanger 900, refer to the discussion of the heat exchanger 600 above. The heat exchanger 900 includes six refrigerant passes 920*a*-920*f*, two primary coolant passes 940*a*-940*b*, and one secondary coolant pass 960*a* that is divided into three parallel cavities. Three of the refrigerant passes 920*a*-

920*f* extend through and exchange heat directly with one of the two primary coolant passes 940*a*-940*b*. The first primary coolant pass 940*a* exchanges heat directly with two of the three secondary coolant passes 960*a*-960*b* (e.g., by sharing intermediate walls therewith). The second primary coolant pass 940*b* exchanges heat directly with two of the three secondary coolant passes 960*b*-960*c* (e.g., by sharing two intermediate walls therewith). The first primary coolant pass 940*a* and the second primary coolant pass 940*b* do not exchange heat directly with each other or with ambient air. The secondary coolant pass 960*a* may additionally exchange heat directly with ambient air via a top wall 904*a* and a bottom wall 904*b*. Variations of the heat exchangers 600, 700, and 800 may similarly include a refrigerant pass configured to exchange heat directly with a secondary coolant pass.

As a result, the heat exchanger 900 may include 17 fluid layers, which include six refrigerant layers (i.e., formed by the six refrigerant passes 920*a*-920*f*), eight primary coolant layers (i.e., formed by the two primary coolant passes 940*a*-940*b* above, below, and between the six refrigerant passes 920*a*-920*f*), and three secondary coolant layers (i.e., formed by the secondary coolant pass 960*a*, below, and between the first primary coolant pass 940*a* and the second primary coolant pass 940*b*.

Figure 10:
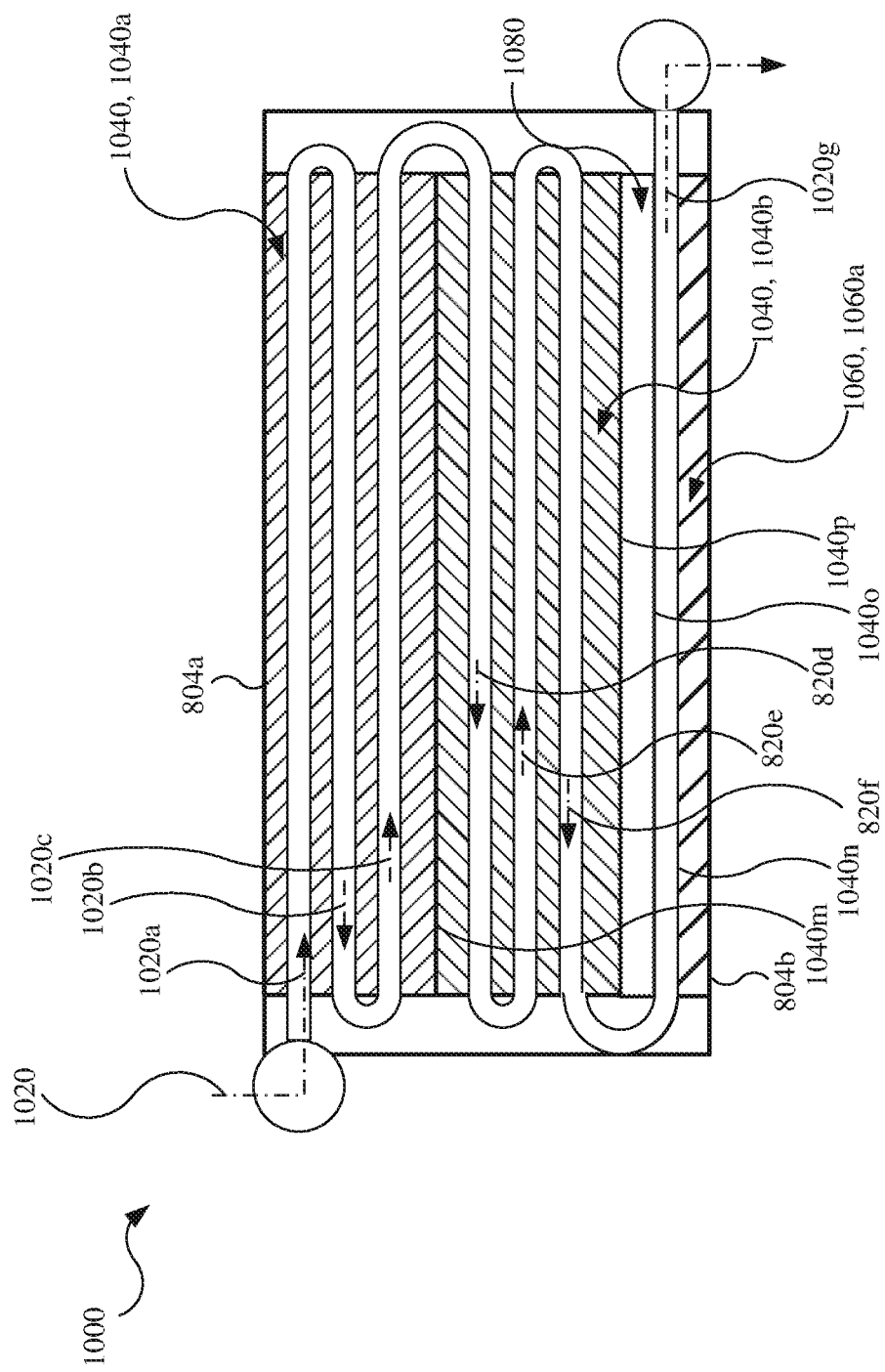
FIG. 10 is a cross-sectional view of another embodiment of a heat exchanger, which is taken similar to the cross-sectional view of FIG. 6F.

Referring to FIG. 10, a heat exchanger 1000 is a variation of the heat exchanger 600 and the heat exchanger 800. For brevity, differences between the heat exchangers 600, 800 and the heat exchanger 1000 are described below. For further understanding of the heat exchanger 1000, refer to the discussion of the heat exchangers 600, 800 above. The heat exchanger 1000 includes a refrigerant passage 1020 having seven refrigerant passes 1020*a*-1020*g*, a primary coolant passage 1040 having two primary coolant passes 1040*a*-1040*b*, one secondary coolant pass 1060*a*, and an insulating chamber 1080. Three of the refrigerant passes 1020*a*-1020*f* extend through and exchange heat directly with one of the two primary coolant passes 1040*a*-1040*b*. The first primary coolant pass 1040*a* and the second primary coolant pass 1040*b* may exchange heat directly with each other (e.g., by sharing an intermediate wall 1040*m* therewith). The seventh refrigerant pass 1020*g* may exchange heat directly with the secondary coolant pass 1060*a* (e.g., by sharing another intermediate wall 1040*n* therewith). The insulating chamber 1080 has no fluid flow therethrough and insulates the second primary coolant pass 1040*b* from the secondary coolant pass 1060*a*, for example, by sharing different intermediate walls 1040*o*, 1040*p* therewith and forming an air gap therebetween. The insulating chamber 1080 may be incorporated into variations of the heat exchangers 600, 700, 800, and 900 described above.

As a result, the heat exchanger 1000 may include 17 fluid layers, which include seven refrigerant layers (i.e., formed by the seven refrigerant passes 1020*a*-1020*g*), eight primary coolant layers (i.e., formed by the two primary coolant passes 1040*a*-1040*b* above, below, and between the six of the refrigerant passes 1020*a*-1020*f*), one secondary coolant layer (i.e., formed by the secondary coolant pass 1060*a*), and one insulating layer (i.e., formed by the insulating chamber 1080 and having a static fluid, such as air, contained therein).

Figure 11:
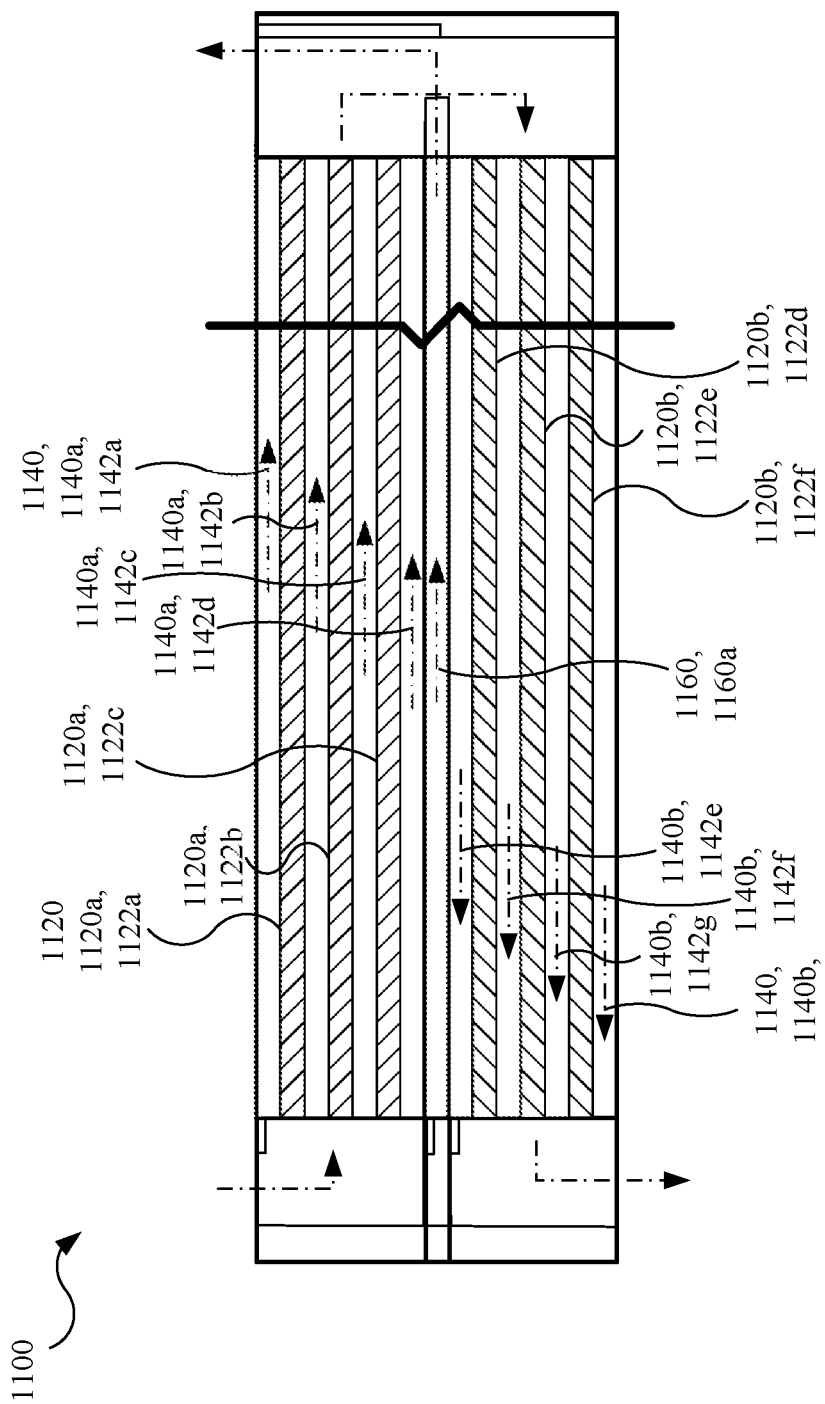
FIG. 11 is a cross-sectional view of another embodiment of a heat exchanger, which is taken similar to the cross-sectional view of FIG. 6E.

Referring to FIG. 11, which is a cross-sectional view taken similar to FIG. 6E, a heat exchanger 1100 is a variation of the heat exchanger 600. The heat exchanger includes a passage 1120, a primary coolant passage 1140, and a secondary coolant passage 1160. The passage 1120, rather than being formed by tubes, is instead formed by cavities 1122*a*-*f* (e.g., six as shown), which form two passes 1120*a*, 1120*b* for a refrigerant, which may be the high pressure coolant described previously or another refrigerant (e.g., R134a), or another coolant. That is flow through a first set of three of the cavities 1122*a*-*c* and another set of three of the cavities 1122*d*-*f* is in parallel, and flow is serial from the first set to the second set. Alternatively, the passage 1120 may be provided with fewer or more cavities 1122*a*-*f* and fewer or more passes (e.g., the six cavities being connected serially to form six passes). The primary coolant passage 1140 is formed by eight cavities 1142*a*-*h*, which form two passes 1140*a*, 1140*b*. The secondary coolant passage 1160 is formed by a single cavity 1162, which forms a single pass 1160*a*. The first pass 1120*a* of the passage 1120 exchanges heat directly with the first pass 1140*a* of the primary coolant passage 1140, the first cavity 1142*a* of which insulates the first pass 1120*a* of the passage 1120 from ambient air and the fourth cavity 1142*d* of which insulates the first pass 1120*a* of the passage 1120 from the secondary coolant passage 1160. The second pass 1120*b* of the passage 1120 exchanges heat directly with the second pass 1140*b* of the primary coolant passage 1140, the last cavity 1142*h* of which insulates the second pass 1120*a* of the passage 1120 from ambient air and the fifth cavity 1142*e* of which insulates the first pass 1120*a* of the passage 1120 from the secondary coolant passage 1160. The pass 1160*a* of the secondary coolant passage 1160 exchanges heat directly with the first pass 1140*a* and the second pass 1140*b* of the primary coolant passage 1140.

As a result, the heat exchanger 1100 includes 15 fluid layers, which include eight primary coolant layers, one secondary coolant layers, and six layers of the refrigerant or additional coolant.

Furthermore, the construction of the heat exchanger 1100 with cavities instead of refrigerant tubes may be applied to the other heat exchangers described previously. Each refrigerant pass would instead be formed by one or more cavities, and each primary coolant layer would be formed by a distinct cavity (i.e., rather than multiple layers being formed by one cavity).

What is claimed is:

1. A method for thermal management of a battery module through use of a battery loop having a battery loop coolant flowing through the battery loop, a heating loop having a heating loop coolant flowing through the heating loop, a cooling loop having a cooling loop coolant flowing through the cooling loop, and a refrigerant loop having a refrigerant flowing through the refrigerant loop, the method comprising:

measuring a temperature of the battery loop coolant;
increasing the temperature of the battery loop coolant flowing to the battery module by directing a flow of the battery loop coolant to one of a heating loop heat exchanger in thermal communication with the heating loop or a liquid cooled gas cooler (LCGC) in thermal communication with the refrigerant loop, wherein the battery loop coolant is not in fluid communication with the heating loop coolant; and
decreasing the temperature of the battery loop coolant flowing to the battery module by directing the flow of the battery loop coolant to one of a cooling loop heat exchanger in thermal communication with the cooling loop or a chiller in thermal communication with the refrigerant loop,
wherein the battery loop coolant is not in fluid communication with the cooling loop coolant,
wherein the step of increasing the temperature of the battery loop coolant with the LCGC includes indirectly transferring heat from the refrigerant to the battery loop coolant by the heating loop coolant, and wherein the step of decreasing the temperature of the battery loop coolant with the chiller includes indirectly transferring heat from the battery loop coolant to the refrigerant by the cooling loop coolant.

2. The method of claim 1, further comprising:

maintaining the temperature of the battery loop coolant flowing to the battery module by directing the flow of the battery loop coolant to bypass the one of the heating loop heat exchanger or the LCGC and to bypass the one of the cooling loop heat exchanger or the chiller;

comparing the measured battery coolant loop temperature to a predetermined battery coolant temperature target value; and determining whether an increase in, a decrease in, or maintaining the temperature of the battery loop coolant is needed based on the battery coolant temperature target value, wherein one of the steps of increasing the temperature of the battery loop coolant, decreasing the temperature of the battery loop coolant, or maintaining the temperature of the battery loop coolant is performed according to the step of determining whether the increase in, the decrease in, or the maintaining of the temperature of the battery loop coolant is needed.

3. The method of claim 2, wherein:

the step of increasing the temperature of the battery loop coolant comprises simultaneously directing a portion of the flow of the battery loop coolant to the one of the heating loop heat exchanger or the LCGC before the battery module and directing another portion of the flow of the battery loop coolant to the battery module without being directed to the one of the heating loop heat exchanger or the LCGC, and the step of decreasing the temperature of the battery loop coolant comprises simultaneously directing a portion of the flow of the battery loop coolant to the one of the cooling loop heat exchanger or the chiller before the battery module and directing another portion of the flow of the battery loop coolant to the battery module without being directed to the one of the cooling loop heat exchanger or the chiller.

4. The method of claim 1, wherein a thermal management system includes the battery loop, the refrigerant loop, the LCGC, and the chiller, and the refrigerant flows through the LCGC and through the chiller.

5. The method of claim 4, wherein the step of increasing the temperature of the battery loop coolant is performed by directing the flow of the battery loop coolant to the LCGC, and the step of decreasing the temperature of the battery loop coolant is performed by directing the flow of the battery loop coolant to the chiller.

6. The method of claim 5, wherein the heating loop coolant flows through the LCGC, and the cooling loop coolant flows through the chiller; and wherein the method further comprises increasing a temperature of the heating loop coolant with the LCGC and decreasing a temperature of the cooling loop coolant with the chiller.

7. The method of claim 6, wherein the step of increasing the temperature of the battery loop coolant and the step of increasing the temperature of the heating loop coolant are performed simultaneously by the LCGC, and the step of decreasing the temperature of the battery loop coolant and the step of decreasing the temperature of the cooling loop coolant are performed simultaneously by the chiller.

8. The method of claim 7, wherein the step of increasing the temperature of the battery loop coolant and the step of increasing the temperature of the heating loop coolant includes transferring heat from the refrigerant to the battery loop coolant and to the heating loop coolant by the LCGC, and the step of decreasing the temperature of the battery loop coolant and the step of decreasing the temperature of the cooling loop coolant includes transferring heat from the battery loop coolant and from the cooling loop coolant to the refrigerant by the chiller.

9. A thermal management system, comprising:

a refrigerant loop having a refrigerant flowing therethrough, a liquid cooled gas cooler (LCGC), and a chiller, the LCGC and the chiller being in fluid communication by the refrigerant;

a heating loop having a heating loop heat exchanger and a heating loop coolant flowing therethrough, the heating loop being in fluid communication with the LCGC by the heating loop coolant;

a cooling loop having a cooling loop heat exchanger and a cooling loop coolant flowing therethrough, the cooling loop being in fluid communication with the chiller by the cooling loop coolant;

a battery loop having a battery loop valve, a battery module, and a battery loop coolant flowing therethrough, the battery loop valve configured to direct the battery loop coolant to:
  (a) one of the LCGC or the heating loop heat exchanger that is in fluid communication with the heating loop by the heating loop coolant, the one of the LCGC or the heating loop heat exchanger configured to increase a temperature of the battery loop coolant upstream of the battery module; and
  (b) one of the chiller or the cooling loop heat exchanger that is in fluid communication with the cooling loop by the cooling loop coolant, the one of the chiller or the cooling loop heat exchanger configured to decrease the temperature of the battery loop coolant upstream of the battery module, wherein the heating loop coolant, the cooling loop coolant, and the battery loop coolant are not in fluid communication, and wherein the increase or decrease in temperature of the battery loop coolant is based on indirect heat transfer from the refrigerant to the battery loop coolant by the heating loop coolant or from the battery loop coolant to the refrigerant by the cooling loop coolant, respectively.

10. The thermal management system of claim 9, wherein:

the refrigerant loop further comprises a compressor, an accumulator having an internal heat exchanger, an expansion valve, and a sensor in fluid communication with the LCGC and the chiller by the refrigerant, the refrigerant loop is self-contained, closed loop, and pre-pressurized with the refrigerant prior to installation into the thermal management system, and the refrigerant loop further comprises a refrigerant radiator in fluid communication with the LCGC and the chiller by the refrigerant.

11. The thermal management system of claim 9, wherein the heating loop further comprises a heating loop valve, a heater core, and a heating loop radiator in fluid communication by the heating loop coolant; and wherein the heater core is downstream of the heating loop valve, the heating loop radiator is downstream of the heating loop valve, and the heating loop valve includes flow positions for selectively directing the heating loop coolant at an elevated temperature from the LCGC to the heater core to provide heated air to a passenger cabin or to the heating loop radiator to decrease the temperature of the heating loop coolant.

12. The thermal management system of claim 11, wherein:
the heating loop further comprises a heater in thermal communication with the heating loop coolant to increase the temperature of the heating loop coolant upstream of the heater core and independently of the LCGC,
the battery loop is in fluid communication with the LCGC by the battery loop coolant, and
the battery loop is in fluid communication with the heating loop heat exchanger by the battery loop coolant to provide heat from the heating loop coolant to the battery loop coolant.

13. The thermal management system of claim 9, wherein:
the cooling loop further comprises a cooling core in fluid communication with the one of the chiller or the cooling loop heat exchanger by the cooling loop coolant to provide cooled air to a passenger cabin,
the battery loop is in fluid communication with the chiller by the battery loop coolant, and
the battery loop is in fluid communication with the cooling loop heat exchanger by the battery loop coolant to provide heat from the battery loop coolant to the cooling loop coolant.

14. The thermal management system of claim 9, further comprising a powertrain loop having a powertrain loop coolant and a powertrain heat exchanger, the powertrain heat exchanger being in fluid communication with a wheel drive motor by the powertrain loop coolant and in fluid communication with the cooling loop by the cooling loop coolant to decrease a temperature of the powertrain loop coolant to the wheel drive motor.

15. The thermal management system of claim 14, wherein the powertrain loop further comprises a powertrain loop valve and a powertrain radiator, the powertrain loop valve having flow configurations for directing the powertrain loop coolant to the cooling loop heat exchanger or the powertrain radiator to decrease the temperature of the powertrain loop coolant.

16. The thermal management system of claim 15, wherein the powertrain loop valve comprises five alternative powertrain loop coolant flow configurations comprising:
a cooling loop heat exchanger flow configuration in which the powertrain loop coolant flows from the powertrain loop valve to the cooling loop heat exchanger;
a radiator flow configuration in which the powertrain loop coolant flow from the powertrain loop valve to the powertrain radiator;
a bypass conduit flow configuration in which the powertrain loop coolant flows from the powertrain loop valve to the wheel drive motor without flowing to the cooling loop heat exchanger and without flowing to the powertrain radiator;
a cooling loop heat exchanger and bypass blend configuration in which a portion of the powertrain loop coolant flows from the powertrain loop valve to the cooling loop heat exchanger and another portion of the powertrain loop coolant flows from the powertrain loop valve to the wheel drive motor without flowing to the cooling loop heat exchanger and without flowing to the powertrain radiator; and
a radiator and bypass blend configuration in which a portion of the powertrain loop coolant flows from the powertrain loop valve to the powertrain radiator and another portion of the powertrain loop coolant flows from the powertrain loop valve to the wheel drive motor without flowing to cooling loop heat exchanger and without flowing to the powertrain radiator.

17. A thermal management system, comprising:
a battery loop having a battery loop coolant flowing therethrough;
a heating loop having a heating loop coolant flowing through a heating loop heat exchanger that is configured to supply heat to the battery loop coolant;
a cooling loop having a cooling loop coolant flowing through a cooling loop heat exchanger that is configured to absorb heat from the battery loop coolant;
a refrigerant loop having a refrigerant flowing therethrough;
a liquid cooled gas cooler (LCGC) that is in thermal communication with the refrigerant loop and is configured to supply heat to the battery loop coolant without contact between the heating loop coolant and the battery loop coolant; and
a chiller that is in thermal communication with the refrigerant loop and is configured to absorb heat from the battery loop coolant without contact between the cooling loop coolant and the battery loop coolant.

18. The thermal management system of claim 17, wherein the heating loop further comprises a heating loop valve, a heater core, and a heating loop radiator in fluid communication by the heating loop coolant; and
wherein the heater core is downstream of the heating loop valve, the heating loop radiator is downstream of the heating loop valve, and the heating loop valve includes flow positions configured to selectively direct the heating loop coolant from the LCGC to the heater core to provide heated air to a passenger cabin or to the heating loop radiator to decrease the temperature of the heating loop coolant.

19. The thermal management system of claim 17, wherein the refrigerant loop further comprises a compressor, an accumulator having an internal heat exchanger, an expansion valve, and a sensor in fluid communication with the LCGC and the chiller by the refrigerant, wherein the refrigerant loop is self-contained, closed loop, and pre-pressurized with the refrigerant prior to installation into the thermal management system, and wherein the refrigerant loop further comprises a refrigerant radiator in fluid communication with the LCGC and the chiller by the refrigerant.

\* \* \* \* \*

UNITED STATES PATENT AND TRADEMARK OFFICE
CERTIFICATE OF CORRECTION

PATENT NO. : 11,207,939 B2
APPLICATION NO. : 16/089641
DATED : December 28, 2021
INVENTOR(S) : Vincent G. Johnston, Donald P. Yuhasz and Mark R. Hoehne Page 1 of 1

It is certified that error appears in the above-identified patent and that said Letters Patent is hereby corrected as shown below:

In the Claims

At Column 29, Claim number 16, Line number 52, "coolant flow from" should be --coolant flows from--.

At Column 30, Claim number 16, Line number 14, "to cooling loop" should be --to the cooling loop--.

Signed and Sealed this
Eighth Day of March, 2022

Drew Hirshfeld
*Performing the Functions and Duties of the*
*Under Secretary of Commerce for Intellectual Property and*
*Director of the United States Patent and Trademark Office*